United States Patent
Clarke et al.

(10) Patent No.: US 9,447,754 B1
(45) Date of Patent: Sep. 20, 2016

(54) METHOD AND APPARATUS FOR INTERNAL COMBUSTION ENGINE SYSTEM WITH IMPROVED TURBOCHARGING

(71) Applicant: Bright Acceleration Technologies, LLC, Sheboygan Falls, WI (US)

(72) Inventors: James R. Clarke, Levering, MI (US); Richard J. Fotsch, Sheboygan Falls, WI (US)

(73) Assignee: Bright Acceleration Technologies LLC, Sheboygan Falls, WI (US)

( * ) Notice: Subject to any disclaimer, the term of this patent is extended or adjusted under 35 U.S.C. 154(b) by 0 days.

(21) Appl. No.: 14/849,088

(22) Filed: Sep. 9, 2015

Related U.S. Application Data

(60) Provisional application No. 62/188,181, filed on Jul. 2, 2015.

(51) Int. Cl.
  F02B 33/44 (2006.01)
  F02M 25/07 (2006.01)
  F02B 75/02 (2006.01)

(52) U.S. Cl.
  CPC ........... F02M 25/0711 (2013.01); F02B 75/02 (2013.01); F02B 2075/027 (2013.01)

(58) Field of Classification Search
  CPC .............. F02M 25/0711; F02B 75/02; F02B 2075/027; F02B 33/44; F02B 37/013
  USPC .................................... 60/602, 612; 123/562
  See application file for complete search history.

(56) References Cited

U.S. PATENT DOCUMENTS

| | | | |
|---|---|---|---|
| 2,583,430 A | 1/1952 | Kadency | |
| 4,228,655 A * | 10/1980 | Herschmann | F02B 37/00 251/129.1 |
| 4,400,944 A | 8/1983 | Iwamoto et al. | |
| 4,427,087 A | 1/1984 | Inoue et al. | |
| 4,432,205 A * | 2/1984 | Inoue | F02B 37/00 180/219 |
| 4,630,446 A | 12/1986 | Iwai et al. | |

(Continued)

OTHER PUBLICATIONS

Internet Archive. Website crawl record [online]. Internet Archive Wayback Machine [retrieved on Jan. 13, 2016]. Retrieved from the internet: <URL: https://web.archive.org/web/20121227140611/http://www.hotrodsandcoolstuff.com/enginebuild.html>.*

(Continued)

*Primary Examiner* — Nicholas J Weiss
*Assistant Examiner* — Jason T Newton
(74) *Attorney, Agent, or Firm* — C. Thomas Sylke

(57) ABSTRACT

Systems, methods, apparatus provide improved turbocharging of an internal combustion engine. A single, discrete turbocharger is affixed to each engine combustion cylinder. Turbochargers can be mounted to their associated cylinders in close proximity, thus harvesting higher energy exhaust gases from each combustion cylinder. Tip in and spool up responses can be further improved using low rotational inertia turbochargers that can operate effectively across a wide range of engine operational speeds. Controlled balancing valves between cylinder exhaust lines can deliver exhaust gases from a single cylinder selectively to multiple turbochargers in appropriate operational conditions. Moreover, multiple turbochargers' compressors can be configured in series to achieve pressurization compounding of combustion air for low RPM operation. Nesting of turbochargers relative to one another permits improved mounting of each turbocharger in close proximity to its corresponding combustion cylinder.

7 Claims, 10 Drawing Sheets

(56) References Cited

U.S. PATENT DOCUMENTS

| | | | |
|---|---|---|---|
| 4,993,227 A | 2/1991 | Nagura et al. | |
| 5,488,827 A | 2/1996 | Helmich et al. | |
| 5,884,478 A * | 3/1999 | Edmonds, Jr. | F02B 37/14 60/612 |
| 6,170,443 B1 | 1/2001 | Hofbauer | |
| 6,279,320 B1 * | 8/2001 | Mailander | F02B 37/002 60/612 |
| 6,925,971 B1 | 8/2005 | Peng et al. | |
| 6,957,632 B1 | 10/2005 | Carlson et al. | |
| 7,712,311 B2 | 5/2010 | Ren et al. | |
| 7,886,530 B2 | 2/2011 | Winsor et al. | |
| 7,921,648 B2 | 4/2011 | Eitel et al. | |
| 7,937,941 B2 | 5/2011 | Nau et al. | |
| 8,151,567 B2 | 4/2012 | Rollinger et al. | |
| 8,176,735 B2 | 5/2012 | Komatsu | |
| 8,210,136 B2 | 7/2012 | Howard | |
| 8,256,213 B2 | 9/2012 | Kuhlbach et al. | |
| 8,266,906 B2 | 9/2012 | Wu et al. | |
| 8,316,639 B2 | 11/2012 | Takahashi et al. | |
| 8,333,071 B2 | 12/2012 | Oakley et al. | |
| 8,336,309 B2 | 12/2012 | McEwan et al. | |
| 8,359,859 B2 | 1/2013 | Shiraishi | |
| 8,442,743 B2 | 5/2013 | Massard et al. | |
| 8,499,726 B2 | 8/2013 | Cox | |
| 8,499,747 B2 | 8/2013 | Schmalzl | |
| 8,544,268 B2 | 10/2013 | Begin | |
| 8,567,191 B2 | 10/2013 | Geyer | |
| 8,572,961 B2 | 11/2013 | Karnik et al. | |
| 8,596,252 B2 | 12/2013 | Liu et al. | |
| 8,683,799 B2 | 4/2014 | Azuma | |
| 8,713,937 B2 | 5/2014 | Pursifull et al. | |
| 8,733,088 B2 | 5/2014 | Reinhart et al. | |
| 8,747,788 B1 | 6/2014 | Baig et al. | |
| 8,783,029 B2 | 7/2014 | Vigild et al. | |
| 8,793,999 B2 | 8/2014 | Rebhan et al. | |
| 8,806,869 B2 | 8/2014 | Petrovic | |
| 8,813,494 B2 | 8/2014 | Hofer et al. | |
| 8,820,071 B2 | 9/2014 | Tkac | |
| 8,844,282 B2 | 9/2014 | Jaegle et al. | |
| 8,863,514 B2 | 10/2014 | Joergl et al. | |
| 8,881,522 B2 | 11/2014 | Jebasinski et al. | |
| 8,984,878 B2 | 3/2015 | Grosch et al. | |
| 8,991,177 B2 | 3/2015 | Rutschmann et al. | |
| 8,997,487 B2 | 4/2015 | Drangel et al. | |
| 9,002,619 B2 | 4/2015 | Ito et al. | |
| 9,021,806 B2 | 5/2015 | Kuhlbach et al. | |
| 9,027,539 B2 | 5/2015 | Miyashita | |
| 2004/0020205 A1 * | 2/2004 | Mailander | F02B 37/007 60/612 |
| 2005/0169764 A1 * | 8/2005 | Geoffrey Heyes | F01D 5/025 416/244 A |
| 2009/0038309 A1 * | 2/2009 | Cocca | F02B 37/013 60/603 |
| 2010/0122530 A1 * | 5/2010 | French | F01N 5/04 60/602 |
| 2013/0167527 A1 | 7/2013 | Cattani et al. | |
| 2013/0233289 A1 * | 9/2013 | Mailander | F02B 37/002 123/562 |
| 2015/0121862 A1 | 5/2015 | Wade et al. | |
| 2015/0159660 A1 | 6/2015 | Kares et al. | |

OTHER PUBLICATIONS

Internet Archive. Website crawl record [online]. Internet Archive Wayback Machine [retrieved on Jan. 13, 2016]. Retrieved from the internet: <URL: https://web.archive.org/web/20060316150840/http://www.gizmag.com/go/5227/>.*

Ulrich, Lawrence. "Carmakers Find That Turbos Are a Powerful Path to Fuel Efficiency". The New York Times company. Feb. 26, 2015.

Borgwarner Turbo Systems; Design and Function of a Turbocharger: Turbine; downloaded from www.turbos.bwauto.com on May 31, 2015.

Kane, Jack; Exhaust System Technology—The Sound and The Fury; EPI Inc.; downloaded from www.epi-eng.com on May 31, 2015; modified version of an article appearing in Race Engine Technology magazine; Issue 036; Feb. 2009.

* cited by examiner

METHOD AND APPARATUS FOR INTERNAL COMBUSTION ENGINE SYSTEM WITH IMPROVED TURBOCHARGING

RELATED APPLICATIONS

This application hereby claims the benefit of and priority to U.S. Provisional Patent Application 62/188,181, entitled "INTERNAL COMBUSTION ENGINE WITH IMPROVED TURBOCHARGING," filed Jul. 2, 2015, and which is hereby incorporated by reference in its entirety.

TECHNICAL FIELD

The disclosure relates to internal combustion engines and the use of turbochargers therewith.

TECHNICAL BACKGROUND

Improved vehicle fuel economy is both a consumer expectation and a regulatory requirement. For example, federal regulations have been implemented that require 40% improvement in fuel economy for passenger cars and light trucks. One approach to achieving such dramatic improvements has been to reduce engine size. Engine size reductions have been disproportionately greater than vehicle weight reductions and aerodynamic improvements, thus resulting in under-powered vehicles and poor vehicle performance. Some engine power can be recovered by boosting engines with turbochargers and/or superchargers. However, boosting smaller engines with turbocharging commonly results in turbo lag, which is the delay between the demand for increased power (opening of the throttle) and the turbocharger providing increased air pressure and enhanced engine power. Traditional turbochargers that receive exhaust gases from multiple cylinders in an engine can be configured to reduce turbo lag to acceptable customer expectations (e.g., as is typically done by restricting a turbocharger turbine inlet nozzle, implementing a variable geometry inlet nozzle in a diesel engine, or multiple turbine turbochargers that utilize exhaust gases aggregated from multiple combustion chambers), but this has come at the expense of high RPM performance in traditional turbocharged engine configurations—that is, immediate turbo response at tip in has meant less power at high RPMs. Putting a smaller nozzle on a turbocharger turbine inlet effectively increases exhaust gas velocity, but causes a substantial increase in back pressure, which degrades fuel economy by creating parasitic exhaust pumping work and elevating engine temperatures, which reduce combustion efficiency and component reliability.

Under turbo lag acceleration conditions, driver torque demand forces fuel air mixtures to become very rich to achieve higher engine torque output, which leads to degraded fuel economy and emissions (optimum fuel and emissions are normally closed-loop-controlled at stoichiometric, 14.6 to 1.0 air-fuel ratio). It is common during acceleration in current engines for air to fuel ratios to drop to a range between 12.0 to 1.0 and 9.0 to 1.0 to improve acceleration. These rich air-fuel ratios reduce fuel economy and increase emissions.

Turbochargers have two essential components:
  a turbine wheel that harvests energy from engine exhaust gas, and
  a compressor wheel that is connected to and driven by rotation of the turbine wheel.

The compressor delivers fresh air to the engine creating pressure and increasing induction charge density under which engine power will increase in proportion to the elevated charge density. Both components of the turbocharger are centrifugal pumps that achieve high efficiency at high rotational speeds (e.g., 100,000 RPM to 300,000 RPM, depending on turbine wheel diameter and maximum engine output). At low RPMs, the turbine wheel and compressor wheel outputs are low, providing a slow-rising pressure curve of increased charge density and a corresponding slow-rising engine power output. The above is most evident when a vehicle accelerates from a standing start, producing noticeable turbo lag during such transient acceleration conditions. Turbocharger systems to date (also referred to as "earlier systems" and the like) have collected exhaust gases from a number of cylinders in a manifold or similar exhaust gas collecting or aggregating structure and directed the collected gases to a single turbine situated significantly downstream of the exhausting cylinders.

Each combustion chamber of an engine is designed to accelerate piston movement as a result of controlled explosive combustion. The process is approximately 25% efficient; the remaining 75% is thermally disbursed to the cooling system and the exhaust system. Transfer of energy to an engine's exhaust system is driven by combustion pressure, the energy being released through each combustion chamber's exhaust valve(s). At low engine loads, and immediately before the exhaust valve opens, combustion chamber pressure is high and pressure outside the exhaust port is low. When the exhaust valve opens, the high pressure differential between the combustion chamber and the exhaust port creates a high velocity pulse. In traditional engine configurations, the high velocity pulse is dissipated by a number of factors (e.g., the volume of the exhaust manifold, turns and distance in the exhaust gases' path between the exhaust valve and the turbine wheel entrance due to multiple cylinders and multiple exhaust runners feeding a single turbine wheel. The pulse can also be dissipated in some engines (e.g., four cylinder and five cylinder applications) due to interference between exhaust gases from two cylinders whose exhaust discharges overlap.

Overview

Implementations of an internal combustion engine include a single turbocharger mounted to each combustion cylinder to provide improved harvesting of exhaust gas energy. In some implementations each turbocharger is mounted in close proximity to its associated combustion cylinder to provide improved harvesting of exhaust gas energy due to the short exhaust gas travel distance, small volume, and minimal turns between the exhaust valve and the turbine wheel. Dynamic engine charge boosting is improved, as is the harvesting of exhaust gas energy (including harvesting energy during pulse exhaust gas conditions, which has been lost in traditional turbocharging systems due to those systems' mixing of multiple cylinders' exhaust gases, long exhaust gas travel distances, larger volumes, and prevalent bending and turns in the path between the combustion cylinder exhaust valve and the turbine wheel). Additionally, a single, smaller turbocharger per cylinder as disclosed and claimed in some implementations herein permits dramatic reduction in the moment of inertia (i.e., rotational inertia) to be overcome by the turbine and compressor wheels (in some cases by more than 50%) as compared to one large turbocharger collecting multiple-cylinder exhaust gases—the improved rotational inertia characteristics are due to the smaller diameters and masses of the turbines and compressor wheels used in the disclosed and claimed implementations. As a result, a single turbocharger per cylinder can provide improved engine response with less restriction of the turbocharger inlet, substantially reducing or eliminating turbo lag time, while maintaining an efficient air-fuel ratio—that is, engines equipped with such implementations exhibit no lag, better fuel economy and reduced exhaust emissions.

Traditional approaches to turbocharging utilize a single turbocharger sized to serve multiple cylinders, requiring high rotational inertia turbine and compressor wheels with no dynamic opportunities to increase boost at low RPM and/or light load conditions. Additionally, as noted above with regard to such traditional approaches, because of runner length, larger volume, additional turns and added friction there is no practical way for a single turbocharger serving multiple cylinders to harvest exhaust pulse energy—the turbocharger is too far away from the cylinders both physically and functionally to permit such harvesting.

In addition to the quicker turbocharger response, multiple compressors (one in each cylinder's associated turbocharger) permit alternate modes of compressor output configuration. "In series" compressor boosting can be configured so that one compressor feeds compressed air to the input of the next turbocharger's compressor, for example for low load conditions. In an exemplary 3-cylinder engine, boost pressure thus can be tripled at low loads. Once the initial vehicle launch is achieved, the serial compressed air configuration can be reconfigured to parallel operation (e.g., through controlled valving of the compressors' outputs to an intake air manifold or the like). Additionally, under part throttle conditions, "in series compressor air boosting" can raise torque by 200% to 300% (depending on the number of cylinders), allowing earlier shift schedules, which improves fuel economy. Thus, interconnection of compressors as disclosed, taught and claimed in some implementations herein permits (1) "in series" centrifugal compressor air boosting that increases charge density at low RPMs and/or light loads (e.g., where a second compressor is additive to a first compressor and a third compressor is additive to the second compressor), and (2) parallel compressor alignment that provides charge density control under medium to high RPMs and/or load conditions.

The single turbocharger per cylinder engine configuration also allows for a larger turbine intake port (i.e., no restricted nozzle size as in earlier turbocharger systems), which reduces exhaust back pressure and lowers cylinder head temperatures, thereby improving fuel economy. In four and five cylinder engines, the single turbocharger per cylinder eliminates blow down interference and the loss of efficiency experienced in dual scroll turbochargers.

A single turbocharger per cylinder engine implementation can eliminate detectable turbo lag during acceleration from a standing start. It also allows closed loop stoichiometric fuel control (i.e., maintaining the 14.6 to 1 air-fuel ratio) under a wider range of operating conditions, providing improved fuel economy and emissions. Further, under transient acceleration conditions, implementations disclosed herein greatly extend and maintain stoichiometric fuel control (i.e., 14.6 to 1 air-fuel ratio) providing improved fuel economy and emissions characteristics.

Systems, methods, apparatus, and software for turbocharging an internal combustion engine are provided herein. In one example, a turbocharger is affixed (in some implementations in close proximity to) the exhaust valve(s) of each cylinder (or other combustion chamber). Each turbocharger has a turbine having an inlet configured to receive high energy exhaust gas from the combustion chamber to which the turbocharger is affixed. Each turbine drives a compressor that receives fresh air (which can be previously compressed air or not) and pressurizes that incoming fresh air before it is discharged via the compressor's outlet. The outputs of several turbochargers' compressors can be configured in series relative to one another's compressor inlets to compound pressurization of fresh air before it is delivered to an intake manifold or the like, or can be configured in parallel so that each compressor delivers its output compressed fresh air directly to the intake manifold. Wastegates can be provided for each turbocharger to permit bypassing the turbocharger's turbine under certain conditions.

In some implementations balancing valves can be provided in lieu of (or in addition to) wastegates and can be configured to provide cross-flow delivery of exhaust gas from one cylinder to the turbine inlet of a different cylinder's turbocharger turbine. Such cross-flow delivery can assist in balancing exhaust gas flow through the turbochargers and reduce turbulence. Aspects and components of the various implementations can be controlled by a control system such as an engine control unit or the like. Use of one or more balancing valves interconnecting turbine inlet passages (a) allows switching from or transitioning between exhaust gas pulse flow with little or no cross-flow between turbochargers (e.g., at low RPMs and/or light loads) to constant pressure flow with greater cross-flow between turbochargers (e.g., for improved stability at high loads), and (b) can provide a conduit to a single wastegate that serves all cylinders to control maximum boost pressure.

The various implementations provide advantages over other internal combustion engine turbocharging systems, including (either alone or in combination):

enhanced harvesting of combustion chamber exhaust gas energy due to the closer proximity of individual turbochargers affixed near each combustion chamber's exhaust valve(s);
 faster turbocharger response due to reduced rotational inertia of smaller turbocharger component sizes (e.g., for turbines and compressor wheels);
 larger turbine inlet sizes that permit better performance at high RPMs and reduce exhaust gas back pressure when encountering turbocharger turbines;
 lower combustion temperatures and power head component temperatures resulting from reduced back pressure, which improves fuel economy and maintenance and repair of parts;
 maintenance of air-fuel ratios throughout a wide range of engine speeds;
 improved fuel economy in transient acceleration conditions and changing power demands.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the views. While multiple embodiments are described in connection with these drawings, the disclosure is not limited to the embodiments disclosed herein. On the contrary, the intent is to cover all alternatives, modifications, and equivalents.

DETAILED DESCRIPTION

Figure 1A:
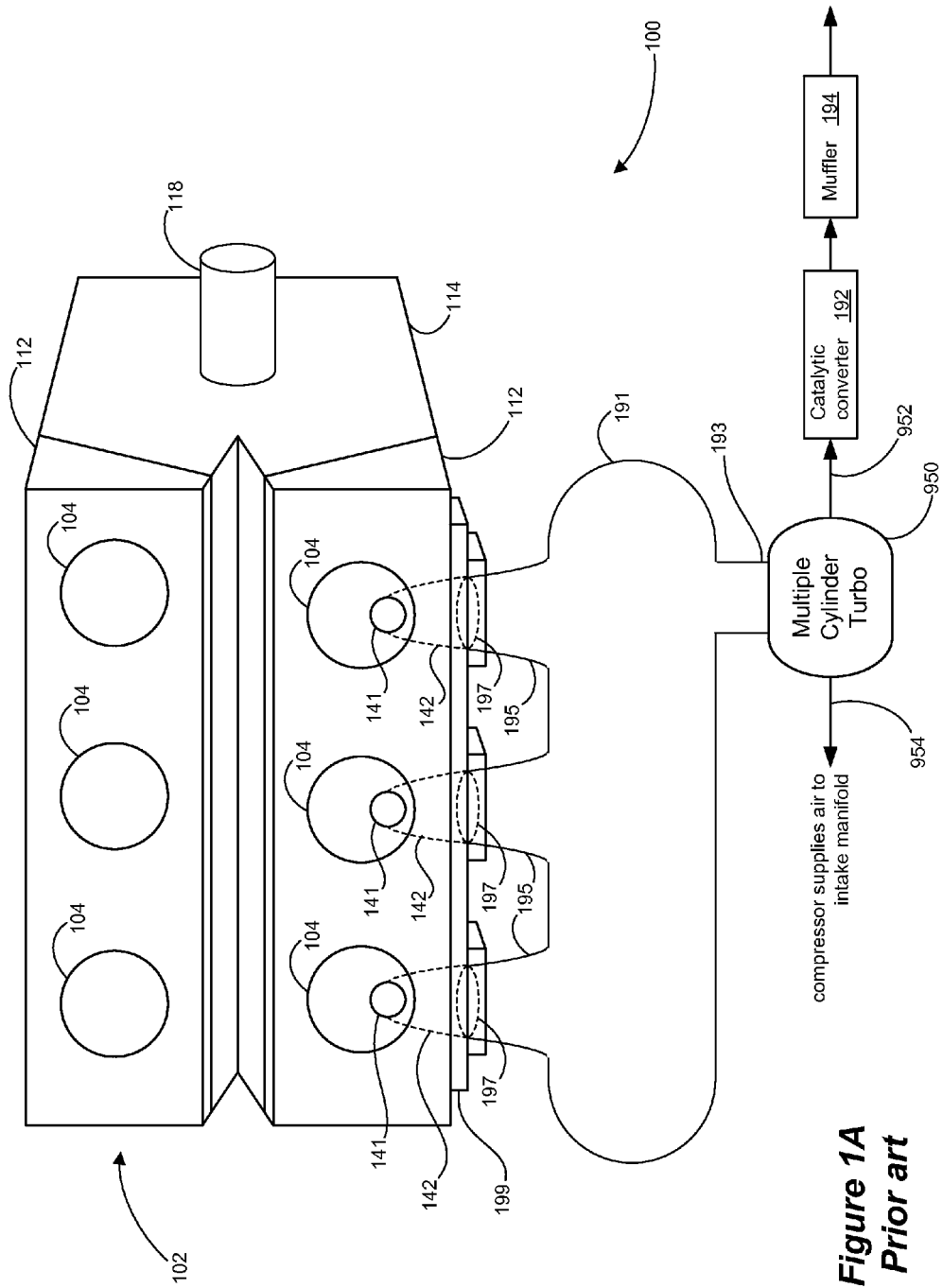
FIG. 1A illustrates a prior art internal combustion engine system.

Implementations of an engine with improved turbocharging include apparatus, methods, systems and other implementations in which a single, discrete turbocharger is coupled to each cylinder (or "combustion chamber") in a multi-cylinder, 4-cycle internal combustion engine. Because each turbocharger is connected directly to a single cylinder, the turbochargers in some implementations can harvest energy from higher energy cylinder exhaust gases and utilize smaller turbines and compressors than the multiple-cylinder-driven turbines of existing turbocharging systems. These implementations thus provide improved harvesting of exhaust gas energy and improved spool up and operational characteristics due to the lower rotational inertia of smaller single-cylinder-driven turbochargers and their close proximity to individual cylinders' exhaust valve(s). In some of these implementations, a single, low rotational inertia turbocharger is mounted in close proximity to each combustion chamber's exhaust valve(s), substantially closer to the exhaust valve(s) than in existing turbocharging systems and methods. The combination of higher energy exhaust gas driving the turbochargers and the lower rotational inertial characteristics of the turbochargers reduce or eliminate the impact of turbo lag typically experienced with earlier systems and the like. Implementations disclosed herein accomplish this without the more complex and expensive approaches for reducing turbo lag that have been attempted in the past.

Internal combustion engines with improved turbocharging include apparatus, methods and other implementations in which the output of each combustion cylinder in an engine is coupled to the turbine inlet of an individual turbocharger; such implementations may also include one or more of the following:
  each coupled turbocharger being affixed in close proximity to its associated cylinder;
  compressed air delivery to the intake air system based on in series and/or parallel compressor configurations;
  balancing valves between turbochargers' turbine inlets that permit cross-flow between turbine inlets;
  controlled operation of the balancing valves;
  low rotational inertia turbochargers Affixing a turbocharger in close proximity to its respective combustion cylinder in some implementations can mean mounting the turbocharger sufficiently close that exhaust gases from the combustion cylinder engage the turbocharger's turbine while the exhaust gases still possess some or all of their pulse characteristics. In other implementations close proximity can mean a measured distance (e.g., less than 10 inches, less than 8 inches, less than 6 inches, less than 4 inches), such distances bringing the turbocharger much closer to the combustion cylinder than has been possible with traditional turbocharging systems.

The use of an "in series" configuration for multiple turbochargers' compressors in some implementations means that the output of one turbocharger's compressor is fed to the inlet of another turbocharger's compressor, so that combustion air is pressurized several times when multiple in series compressor connections of this type are implemented. Such multiple-pressurization configurations can be especially beneficial during tip in, low RPM operation, and/or light load operation.

Balancing valves connecting multiple turbochargers' turbine inlets in some implementations permit cross-flow of exhaust gases from a given combustion cylinder, thus allowing a single cylinder's exhaust gases to impact more than just that combustion cylinder's associated turbocharger turbine. Controlled operation of such balancing valves can allow a single turbocharger to harvest high-energy exhaust gases from just one combustion cylinder during low RPM and/or light load operation (e.g., harvesting energy from such exhaust gases while they still possess pulse characteristics) and also allow multiple turbochargers to receive constant pressure flow of exhaust gases for harvesting of exhaust gas energy once the engine has reached higher RPM and/or load operational levels.

Some implementations allow use of low rotational inertia turbochargers that have smaller-diameter turbine wheels and compressor wheels than have been used in traditional turbocharging systems (e.g., turbochargers in which the turbine wheel measures less than 3 inches, less than 2.6 inches, less than 2.1 inches; also turbochargers in which the turbine wheel has a diameter less than the combustion cylinders' bore diameter). The reduced size of such turbocharger components dramatically reduces the rotational inertia of a turbocharger to yield greatly improved tip in performance. The relative rotational inertia of turbocharger components can be different for various types and sizes of engines. In some implementations the dimensions of each turbocharger's turbine wheel includes a diameter that is less than the bore diameter of the engine's combustion cylinders. This sizing limitation on a turbocharger's turbine wheel in some implementations takes into account different engine sizes while still reducing the turbocharger rotational inertia relative to traditional turbo systems for internal combustion engines.

Combinations of these features permit high performance operation at high RPM and/or load levels. They also provide simple, reliable and economical configurations that yield greatly improved tip in and operation at low RPM and/or light load levels as well as improving fuel economy and exhaust emissions.

Improved vehicle fuel economy is driven by both consumer expectations and regulatory requirements. For example, federal regulations have been implemented that require 40% improvement in fuel economy for passenger cars and light trucks. One approach to achieving such dramatic improvements has been to reduce engine size. Engine size reductions have been disproportionately greater than vehicle weight reductions and aerodynamic improvements, thus resulting in under-powered vehicles and poor vehicle performance. Some engine power can be recovered by boosting engines with turbochargers and/or superchargers. However, boosting smaller engines with turbocharging commonly results in turbo lag. Traditional turbochargers that receive exhaust gases from multiple cylinders in an engine can be configured to reduce turbo lag (e.g., as is typically done by restricting the turbocharger turbine inlet nozzle, or implementing a variable geometry inlet nozzle in diesel engines), but this has come at the expense of high RPM performance in traditional turbocharged engine configurations—that is, immediate turbo response at tip-in has meant less power at high RPMs. In effect, putting a smaller nozzle on a turbocharger turbine input increases exhaust gas velocity, but causes substantial back pressure at high RPMs.

Under turbo lag acceleration conditions in traditional systems, driver torque demand forces fuel air mixtures to become very rich to achieve higher engine torque output, which leads to degraded fuel economy and emissions (optimum fuel and emissions are normally closed-loop-controlled at stoichiometric, 14.6 to 1.0 air-fuel ratio). It is common during acceleration in current engines for air to fuel ratios to drop to a range between 12.0 to 1.0 and 9.0 to 1.0 to improve acceleration. These rich air-fuel ratios in traditional systems reduce fuel economy and increase emissions.

Turbochargers have two essential components:
a turbine wheel that harvests energy from engine exhaust gas, and
a compressor wheel that is connected to and driven by rotation of the turbine wheel.

The compressor delivers fresh air to the engine creating pressure and increasing induction charge density under which engine power will increase in proportion to the elevated charge density. Both components of the turbocharger are centrifugal pumps that achieve high efficiency at high rotational speeds (e.g., 100,000 RPM to 300,000 RPM, depending on turbine wheel diameter and maximum engine output). At low RPMs, the turbine wheel and compressor wheel outputs are low, providing a slow-rising pressure curve of increased charge density and a corresponding slow-rising engine power output. The above is most evident when a vehicle accelerates from a standing start, producing noticeable turbo lag in traditional systems.

Each combustion chamber of an engine is designed to accelerate piston movement as a result of controlled explosive combustion. The process is approximately 25% efficient; the remaining 75% is thermally disbursed to the cooling system and the exhaust system. Transfer of energy to an engine's exhaust system is driven by combustion pressure, the energy being released through each combustion chamber's exhaust valve(s). At low engine loads, and immediately before the exhaust valve opens, combustion chamber pressure is high and pressure outside the exhaust port is low. When the exhaust valve opens, the high pressure differential between the combustion chamber and the exhaust port creates a high velocity pulse. In traditional engine configurations, the high velocity pulse is dissipated by a number of factors (e.g., the volume of the exhaust manifold, turns and distance in the exhaust gases' path between the exhaust valve and the turbine wheel entrance due to multiple cylinders and multiple exhaust runners feeding a single turbine wheel. The pulse can also be dissipated in some engines (e.g., four cylinder and five cylinder applications) due to interference between exhaust gases from two cylinders whose exhaust discharges overlap.

Implementations of an internal combustion engine with improved turbocharging include multiple-cylinder engines having a single turbocharger mounted to each combustion cylinder to provide improved harvesting of exhaust gas energy. In some implementations a single, discrete turbocharger is mounted in close proximity to the exhaust valve(s) of each cylinder in order to harvest exhaust gas pulse energy, which is made possible due to the short exhaust gas travel distance, small volume, and minimal bending/turns in the path between the combustion cylinder exhaust valve and the turbine wheel. Additionally, in some implementations, the single turbocharger used in connection with each cylinder is substantially smaller than a multiple-cylinder turbocharger and thus dramatically reduces (in some cases by more than 50%) the moment of inertia that has to be overcome as compared to one large turbocharger collecting multiple-cylinder exhaust gases—the improved rotational inertia characteristics are due to the smaller diameters and masses of each turbocharger's turbine and compressor wheels. As a result, single turbocharger per cylinder implementations can provide improved engine response, substantially reducing or eliminating turbo lag time while maintaining an efficient air-fuel ratio.

The single turbocharger per cylinder engine configuration also harvests energy from higher energy exhaust gases than is possible with traditional turbocharger systems, allowing for a larger turbine exhaust gas inlet (i.e., eliminating the need for a restricted turbine inlet nozzle size), which reduces exhaust gas back pressure and lowers cylinder head temperatures. In four and five cylinder engines, the single turbocharger per cylinder also eliminates blow down interference and the loss of efficiency experienced in dual scroll turbochargers.

In addition to quicker turbocharger response, the utilization of multiple compressors in some implementations (i.e., one compressor for each cylinder turbocharger) permits serial compressor compounding/boosting (feeding pressurized fresh air output by one compressor to the input of the next compressor) for low load conditions. For example, in a 3-cylinder engine, boost pressure can be tripled at low loads. Once the initial vehicle launch is achieved, compressors configured to provide fresh air pressurization "in series" can be reconfigured to parallel operation (e.g., through valving of the compressor outlets that deliver compressed fresh air to an intake manifold or the like). Additionally, under part throttle conditions, "in series compressor air boosting" can raise torque by 200% to 300% (depending on the number of cylinders), allowing earlier shift schedules, which improves fuel economy. An implementation using a single turbocharger per cylinder can eliminate detectable turbo lag during acceleration from a standing start and permit closed loop stoichiometric fuel control (i.e., maintaining the 14.6 to 1 air-fuel ratio) under all operating conditions, providing improved fuel economy and emissions.

Exhaust gas from an engine cylinder loses energy in several ways after it is discharged from the cylinder. Exhaust gases typically have high energy based on a variety of factors (e.g., temperature, high pressure after combustion, and the pulse nature of their discharge from the combustion chamber (e.g., an engine cylinder)). Turbocharger systems traditionally have suffered exhaust gas energy losses for several reasons. First, such earlier systems utilized primary tubing or runners to conduct exhaust gas to a remote collector or manifold (i.e., a structure that aggregates exhaust gases from 2, 3, 4 or more cylinders), so exhaust gases cooled as they moved from exhaust port to collector. Moreover, exhaust gas velocity slowed in such traditional systems due to bends and turns within, friction within, and the volume of the runners. Also, interference from multiple cylinders' exhaust streams caused exhaust gases to slow. Additionally, the pulse nature of the gases' discharged from their respective exhaust ports was lost due to the same multiple-stream interference, larger volume, bends and turns, and other structural changes in the runners and collectors (once the pulse characteristic is lost, the exhaust gases behave in a manner that more closely resembles constant pressure gas flow). As is well known in the art, reducing heat and other energy losses before exhaust gases reached a multiple-cylinder-driven turbocharger turbine typically permitted the turbine to operate more effectively. Various measures were employed to reduce such energy loss (e.g., dual wall tubing, reflective coatings, wraps, etc.).

However, measures such as heat-retaining pipe insulation had the undesirable consequence of raising the pipes' operating temperature, requiring more expensive specialized materials.

FIG. 1A illustrates an exemplary prior art V6 configuration internal combustion engine 102 that can be part of an internal combustion engine system 100 in a motor vehicle or the like having a turbocharging system that utilizes a multiple-cylinder-driven turbocharger 950. As used herein, the expression "internal combustion engine" encompasses spark-ignition engines, diesel engines and hybrid internal combustion engines.

Engine 102 includes multiple combustion chambers 104 (also referred to herein as "cylinders" in connection with some implementations). The cylinders 104 are defined by an engine block 114 and one or more cylinder heads 112 secured to one another in this example. Each cylinder 104 is defined by walls and has a piston configured to move axially in a reciprocating motion within combustion chamber 104 (each cylinder 104 has a cylinder bore having a diameter 104D is that is substantially equal for all cylinders in a given engine), for example in connection with a four stroke combustion cycle driven by a crankshaft 118. The cylinders 104 of internal combustion engine 102 can be arranged in any appropriate configuration (e.g., a V configuration, an in-line configuration) and implementations of improved turbocharging disclosed herein can be used in a wide variety of such engines, including those used with hybrid vehicles.

An air intake manifold (not shown in FIG. 1) supplies combustion air to each cylinder 104, which has an intake mechanism that includes an intake line and one or more intake ports, each of which is controlled by an intake valve. Exhaust gases are discharged from each cylinder 104 via exhaust port 142 and controlled by an exhaust mechanism that includes one or more exhaust valves 141, each of which is controlled by an exhaust valve mechanism. Each cylinder 104 can include multiple intake ports/valves and multiple exhaust valves. Intake valves and exhaust valves can be controlled mechanically (e.g., by an overhead cam mechanism), electro-magnetically, or can be controlled in other ways known to those skilled in the art (e.g., using an engine control unit (ECU) found in use in connection with various internal combustion engine systems). Moreover, other known intake control mechanisms can be utilized in connection with implementations disclosed and claimed herein (e.g., cross bank control valving, variable length intake manifolds, variable valve lifting, etc.).

In FIG. 1A, an exhaust system for engine 102 includes an exhaust manifold 191 coupled to a first cylinder bank of cylinder head 112. A second exhaust manifold can similarly be coupled to a second cylinder bank and other exhaust manifold configurations are well known to those skilled in the art. Exhaust manifold 191 can include a housing having a plurality of runners 195, each of which has an inlet 197 coupled to the cylinder head 112 via a gasket 199. Each inlet 197 to a runner 195 extends perpendicularly to a longitudinal exhaust manifold axis that is generally parallel to cylinder head 112. Manifold 191 also has a single outlet 193 spaced apart from runners 195. In earlier turbocharger systems, a single turbocharger 950 has been mounted at the exhaust manifold outlet 193. Exhaust gases from multiple combustion cylinders drive turbocharger 950 and are then sent via exhaust line 952 to the exhaust system which is shown also to include a catalytic converter 192 and a muffler 194. In the prior art configuration of FIG. 1A, exhaust gases from at least 3 cylinders 104 drive the turbine of a single turbocharger 950. Pressurized fresh air from the single compressor of turbocharger 950 is supplied via intake air line 954 to an intake manifold or the like.

Figure 1B:
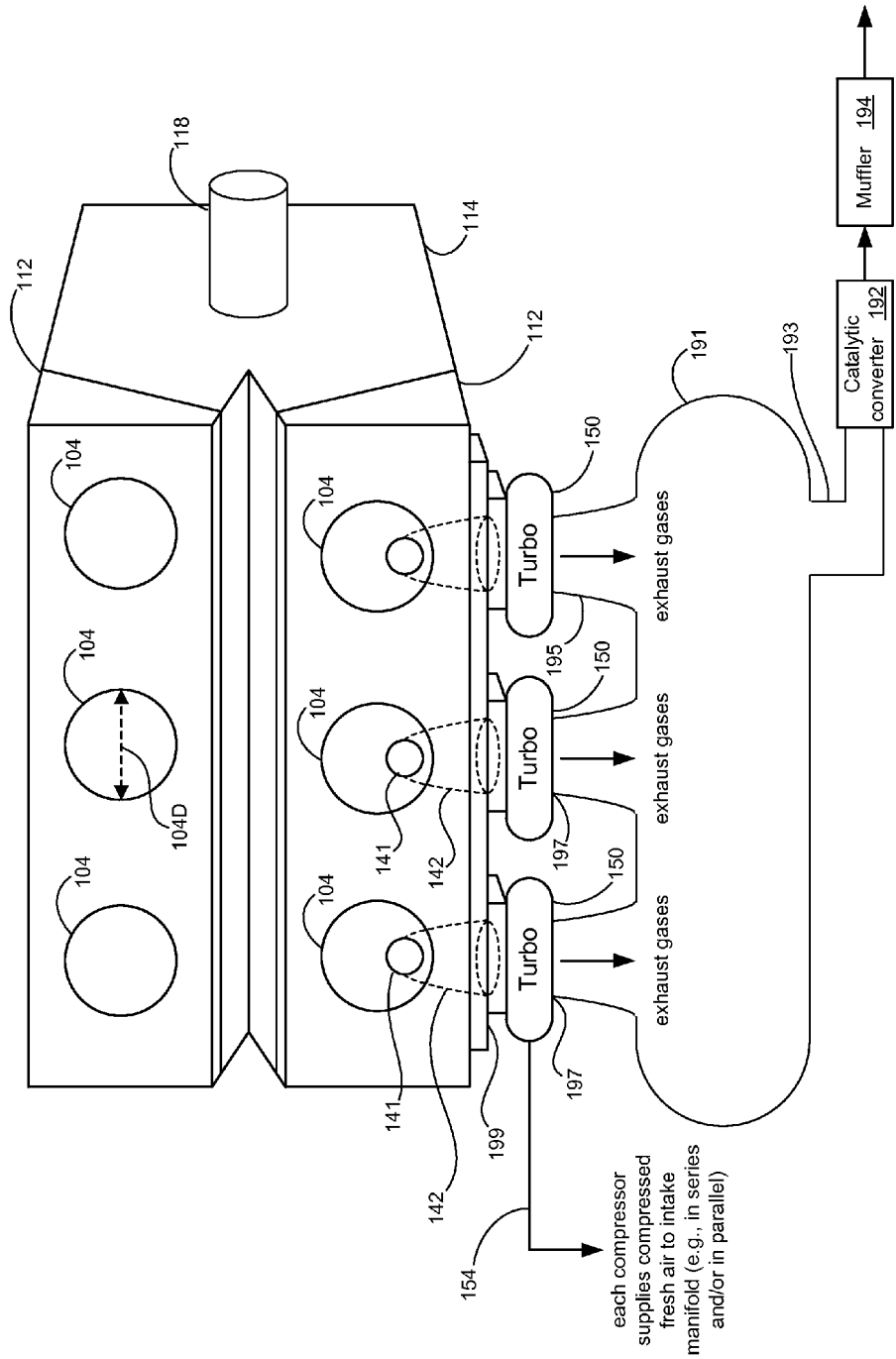
FIG. 1B illustrates an internal combustion engine system.

FIG. 1B illustrates one or more implementations of improved turbocharging in an internal combustion engine 102 using the general engine configuration of FIG. 1A. However, instead of exhaust manifold 191 being mounted directly to cylinder head 112 via gasket 199, a distinct turbocharger 150 is interposed between each cylinder exhaust port in gasket 199 and its corresponding exhaust manifold inlet 197 and runner 195. Each turbocharger 150 includes a turbine, compressor and connecting shaft, along with wastegate and/or other valving structure in some implementations. Pressurized fresh air from the compressors of turbochargers 150 is supplied via intake air line 154 to the intake air system (e.g., an intake manifold or the like). While individual turbochargers 150 can be smaller in size than turbocharger 950 of FIG. 1A, turbochargers 150 may nevertheless be composed of standard, off-the-shelf turbocharger components. Additional features can be provided with each turbocharger 150, as described in more detail herein.

In the examples of FIGS. 1A and 1B, the impact of smaller turbocharger components on spool up can be seen. In the multiple-cylinder turbocharger of FIG. 1A, if the turbine of turbocharger 950 has a diameter of 3.25 inches and a rotating mass of 1.1 pounds, the turbine's moment of inertia is $(0.5)(m*r^2)$ or 1.452 lb-in$^2$. In FIG. 1B, if the turbine of each turbocharger 150 has a diameter of 2.50 inches and a rotating mass of 0.58 pounds, each turbine's moment of inertia is $(0.5)(m*r^2)$ or 0.453 lb-in$^2$. In that illustrative example the individual turbines of FIG. 1B have a moment of inertia that is less than one third that of the turbine of FIG. 1A. Implementations of improved turbocharging in an internal combustion engine can include turbochargers having turbine diameters of less than 3 inches and, in some implementations, less than 2.6 inches and, in yet other implementations, less than 2 inches, thus greatly reducing the rotational inertia of such turbochargers (which includes their compressor wheels and other structure as well) as compared to larger turbochargers used in traditional systems. In some implementations the turbine wheel diameter is limited as being less than the bore diameter of the engine's combustion cylinders. Dimensions for compressor wheels are comparable in many cases to those for turbine wheels, though materials typically differ. Therefore, implementations of improved turbocharging in internal combustion engine systems can include compressor wheels having diameters of less than 3 inches and, in some implementations, less than 2.6 inches and, in yet other implementations, less than 2 inches, thus further reducing the rotational inertia of such turbochargers.

During basic four stroke operation of engine 102, air is introduced into a cylinder 104 through its intake port(s) during an intake stroke that ends with the piston at bottom dead center (BDC) within cylinder 104. Air and fuel are compressed and ignited during the compression and ignition strokes, which end with the piston again at BDC. As the piston moves from BDC to top dead center (TDC) during the exhaust stroke, exhaust gas resulting from combustion is expelled through the cylinder's exhaust valve(s) 141 when the cylinder's exhaust valve(s) mechanism opens. Exhaust gases possess heat and kinetic energy upon discharge from a cylinder, including possessing a "pulse" characteristic when the exhaust gas is still undergoing minimal combustion and volumetric expansion as it is discharged from the combustion chamber.

As is well known to those skilled in the art, various timing methodologies can be used in connection with the opening and closing of intake and exhaust valves. Moreover, individual turbochargers 150 can be mounted to achieve appropriate spacing and plumbing for the engine system 100B of FIG. 1B. For example, turbochargers 150 can be mounted in an alternating up/down orientation that provides additional spacing and permits easier plumbing as required.

Figure 2:
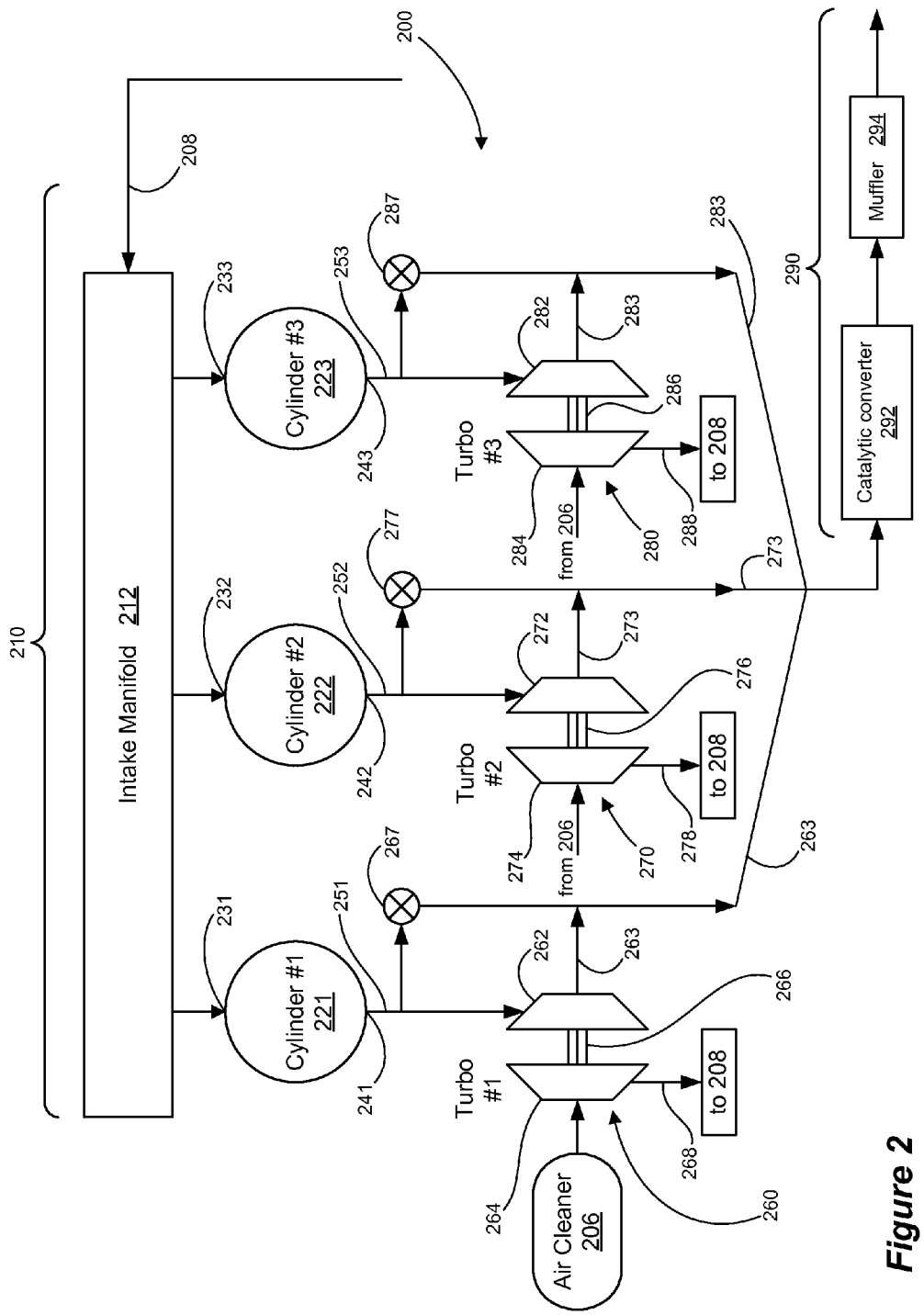
FIG. 2 illustrates an internal combustion engine system.

Various implementations of a fast response, high efficiency engine implementing improved turbocharging are shown in FIGS. 2-5. FIG. 2 illustrates a turbocharged engine system 200 in which a 3-cylinder engine comprises three combustion chambers 221, 222, 223 that can be defined by an engine block and cylinder head.

Cylinders 221, 222, 223 receive combustion air via cylinder intake mechanisms 231, 232, 233, respectively, from a combustion air intake system 210 that includes an intake manifold 212 (air intake and air supply mechanisms are known to those skilled in the art and alternatives can be substituted in implementations disclosed herein). Intake manifold 212 can be configured to accommodate air pressures above atmospheric pressures and thus provide boost pressure to the engine's cylinders 221, 222, 223. Each cylinder intake mechanism 231, 232, 233 can include an intake port controlled by a corresponding intake valve (in some implementations, each cylinder may have multiple intake ports and corresponding intake valves). The volume of air that each cylinder 221, 222, 223 can intake is based on the pressure provided by intake manifold 212.

Each cylinder 221, 222, 223 also has a corresponding exhaust mechanism 241, 242, 243, respectively. As with the intake mechanisms, each exhaust mechanism 241, 242, 243 can include one or more exhaust valves (again, each cylinder can include multiple exhaust valves in some implementations). After combustion within a cylinder, exhaust gases are expelled through an exhaust port. Because the exhaust gases have undergone combustion, and due to other factors such as pressure induced by the piston, the exhaust gases leave the cylinder at a high velocity and enthalpy. Moreover, due to the sudden, high-velocity expulsion of the exhaust gases from the cylinders, such exhaust gases also possess pulse characteristics for a short duration after cylinder expulsion.

In the implementation of FIG. 2 the exhaust valve of each cylinder exhaust mechanism 241, 242, 243 is in fluid communication with a respective turbocharger turbine via exhaust couplings 251, 252, 253, respectively, each of which conducts a given cylinder's exhaust gases to a single, discrete turbocharger. For each cylinder of FIG. 2, its corresponding turbocharger includes a turbine, a corresponding turbine-driven compressor and a wastegate, among other components. In connection with the exhaust mechanism 241 of cylinder 221, for example, exhaust gases discharged from cylinder 221 through the exhaust valve of exhaust mechanism 241 are immediately directed through exhaust coupling 251 to the turbine 262 of turbocharger 260, which is coupled via shaft 266 to a compressor 264 (shaft 276 similarly couples turbine 272 to compressor 274, shaft 286 similarly couples turbine 282 to compressor 284). Atmospheric fresh air (or compressed fresh air from another turbocharger compressor in some implementations) is supplied to each compressor 264, 274, 284 from an air cleaner 206 and/or other appropriate air supply apparatus and is compressed (or further compressed) by operation of turbochargers 260, 270, 280, respectively. Exhaust gases from cylinder 221 are delivered to turbine 262 and thence vented to exhaust line 263, which leads in some implementations to an exhaust system 290 that can include a catalytic converter 292 and a muffler 294 or the like for eventual venting to atmosphere (exhaust lines 273, 283 function in a manner similar to that described in connection with exhaust line 263). In other implementations, exhaust gases can be recirculated or otherwise used for various purposes within engine system 200.

High energy exhaust gases expelled from the exhaust mechanism 241 of cylinder 221 immediately encounter turbine 262, thus allowing turbine 262 to efficiently harvest more exhaust gas energy than was available in other turbocharger systems (e.g., energy due to the exhaust gases still possess high expulsion velocity and pulse characteristics, and prior to substantial volumetric reduction due to cooling, routing, etc.). This is particularly effective in light load, low RPM conditions. Moreover, because the exhaust gases can be delivered via a small cross-section exhaust line 251, the exhaust gases have not expanded as they would normally in an exhaust manifold, an extended runner, or similar exhaust gas aggregating structure(s). This provides turbocharger 260 with nearly optimal energy harvesting in the form of velocity, volume, temperature and other energy transfer characteristics.

Wastegate 267 regulates the exhaust gas flow between the exhaust valve of cylinder 221 and the turbine inlet of turbocharger 260 (wastegates 277, 287 likewise regulate exhaust gas flow relating to cylinders 222, 223, respectively). Regulation by wastegate 267 can be based upon pressure within intake manifold 212 and/or pressure applied to turbine 262 (and thus the rotational velocity of the compressor 264 and the maximum boost pressure delivered by the intake manifold 212). Wastegate 267 is configured to vent excess energy, bypassing turbine 262 and reducing or otherwise assisting in controlling boost pressure in intake manifold 212. Exhaust gases routed through wastegate 267 are likewise directed through exhaust line 263 to the exhaust system 290. The structure and operation of additional cylinders 222, 223 and their respective turbochargers 270, 280 are analogous to that of cylinder 221 and turbocharger 260 described above.

No specific configuration is shown in FIG. 2 for the handling (e.g., routing) of the compressed fresh air that is generated by compressors 264, 274, 284 and subsequently transmitted to intake manifold inlet line 208 by compressor outlets 268, 278, 288, respectively. As can be seen in other implementations disclosed and discussed herein, various compressed fresh air utilization schemes can be implemented (e.g., configuring compressor outputs in series, in parallel, or in a dynamic channel combination).

Turbocharger 260 is connected directly to exhaust mechanism 241 (e.g., where no runner or other intermediate routing structure is interposed between the cylinder head exhaust port and the turbine inlet) and thus is in close proximity to the exhaust valve(s) of cylinder 221. In some implementations the distance between a cylinder's exhaust valve(s) and the corresponding turbocharger's turbine inlet is less than 10 inches and, in some implementations, can be less than 2 inches so that the turbine inlet is virtually adjacent to the cylinder's exhaust valve(s). As noted above, this close proximity to the cylinder exhaust valve(s) allows turbine 262 to harvest significantly more energy from the exhaust gas of cylinder 221 than is possible with existing turbocharging systems in which exhaust gases travel a substantial distance before entering a turbocharger, for example, in systems that collect multiple cylinders' exhaust gases and deliver the collected exhaust gases to a single turbocharger turbine significantly farther "downstream." More specifically, turbine 262 is in a position to receive the exhaust gas of cylinder 221 while that exhaust gas is still moving at a very high velocity and still is in its "pulse" condition. As noted herein, discharged exhaust gas initially moves at a very high velocity and has a pulse characteristic that dissipates rapidly if the exhaust gas travels through an exhaust aggregating system. Traditional turbocharger systems have employed exhaust porting that channeled exhaust gases from multiple cylinders, merging them into a single line or manifold via extended channeling paths. A single turbine powered by that multiple-cylinder exhaust flow had to be situated farther downstream from the cylinders' exhaust ports at a distance that prevented optimal exhaust gas energy harvesting (e.g., while the exhaust gas still possessed the sonic/pulse characteristic and the high velocity achieved at a cylinder's exhaust valve).

Implementations of individualized cylinder turbocharging disclosed herein capture the energy present in the highest velocity exhaust due to turbines being situated as close as practical in proximity to the exhaust valve(s). This configuration allows each turbine to capture pulse energy to enable low RPM and/or low load turbine acceleration, thus supporting bright tip in response. Other turbocharging systems have failed to capture exhaust gas pulse energy due to remote downstream turbocharger turbine positioning that adds volume, time and distance to the exhaust gas travel, thus diluting, reducing and/or eliminating exhaust gas pulse energy.

In addition to the positioning of each turbocharger 260, 270, 280 closer to its cylinder's exhaust valve(s) than in other turbocharging systems, implementations disclosed herein utilize turbines having lower rotational inertia, permitting faster spooling up and bright tip in response. Rotational inertia, friction, and compressor load contribute to turbocharger lag and the smaller, lightweight turbines (and compressor wheels) utilized in connection with some implementations of individual cylinder turbochargers dramatically improve tip in response as compared to the turbines that handle aggregated multiple-cylinder exhaust gases in customary systems.

Figure 3:
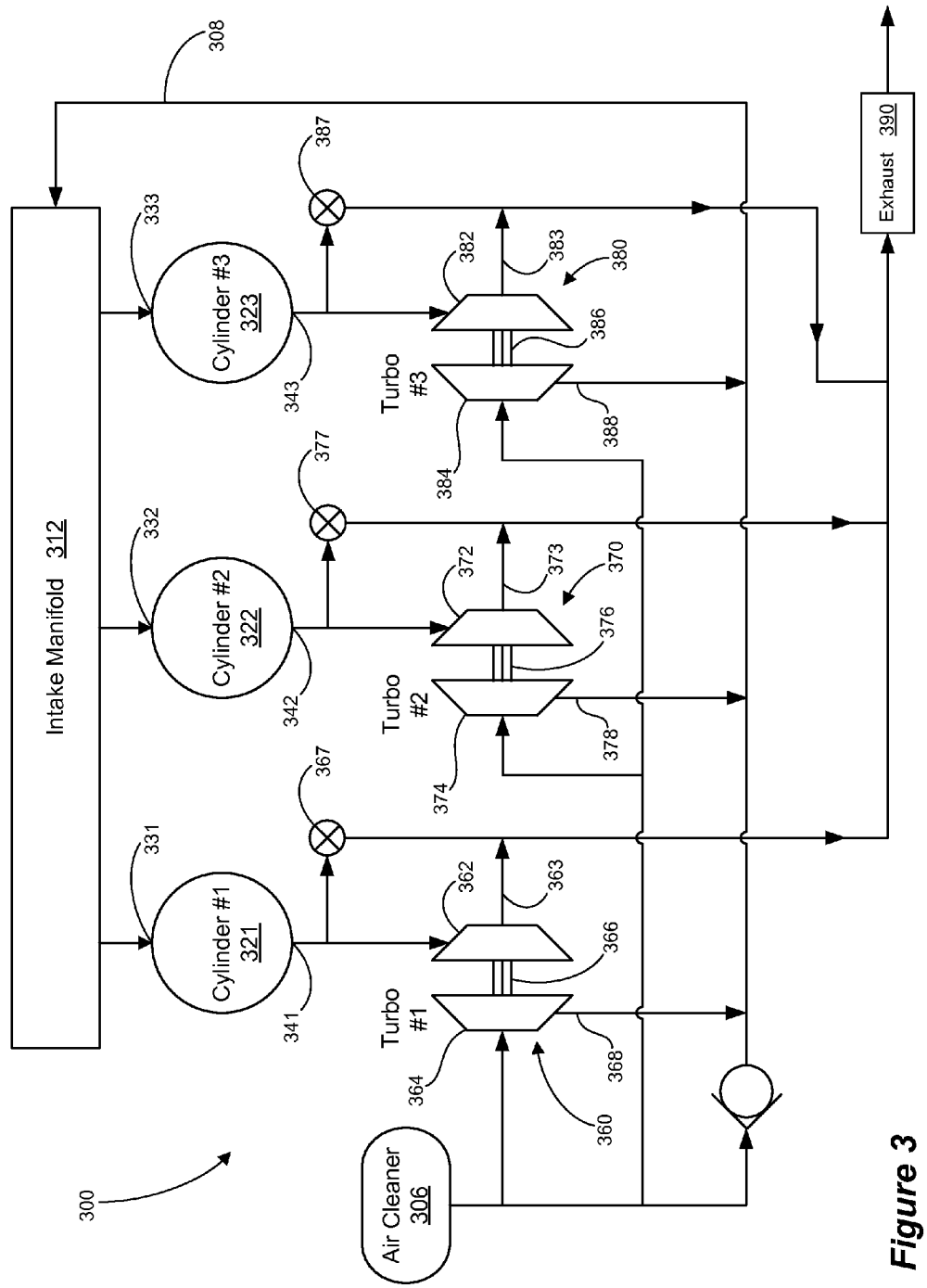
FIG. 3 illustrates an internal combustion engine system.

FIG. 3 illustrates one or more implementations of improved turbocharging in an internal combustion engine system 300 that includes three cylinders 321, 322, 323, again including intake mechanisms 331, 332, 333, respectively, and exhaust mechanisms 341, 342, 343, respectively. Turbocharger 360 has a turbine 362 (situated in close proximity to cylinder 321 in some implementations in order to maximize the energy harvested from exhaust gases being expelled from cylinder 321) and an exhaust line 363 that delivers exhaust gases from the turbine outlet to exhaust system 390. Turbine 362 drives shaft 366 and thus compressor 364 to compress air provided by an intake air system (e.g., including air cleaner 306) and provide compressed fresh air to intake manifold 312 via line 368 and line 308. Cylinder 322 and its associated turbocharger 370 (with turbine 372 coupled to compressor 374 by shaft 376 and with an exhaust line 373 that delivers exhaust gases from the turbine outlet to exhaust system 390) operate in analogous manner, as do cylinder 323 and its associated turbocharger 380 (with turbine 382 coupled to compressor 384 by shaft 386 and with an exhaust line 383 that delivers exhaust gases from the turbine outlet to exhaust system 390). Wastegates 367, 377, 387 operate as described with regard to the wastegates shown and described in connection with FIG. 2.

In the implementation(s) of FIG. 3, the compressor outlets 368, 378, 388 leading from the cylinders' individual turbochargers 360, 370, 380, respectively, are fed in parallel to intake manifold 312. That is, the compressed fresh air output of each turbocharger's compressor is channeled directly to the intake manifold 312.

Figure 4:
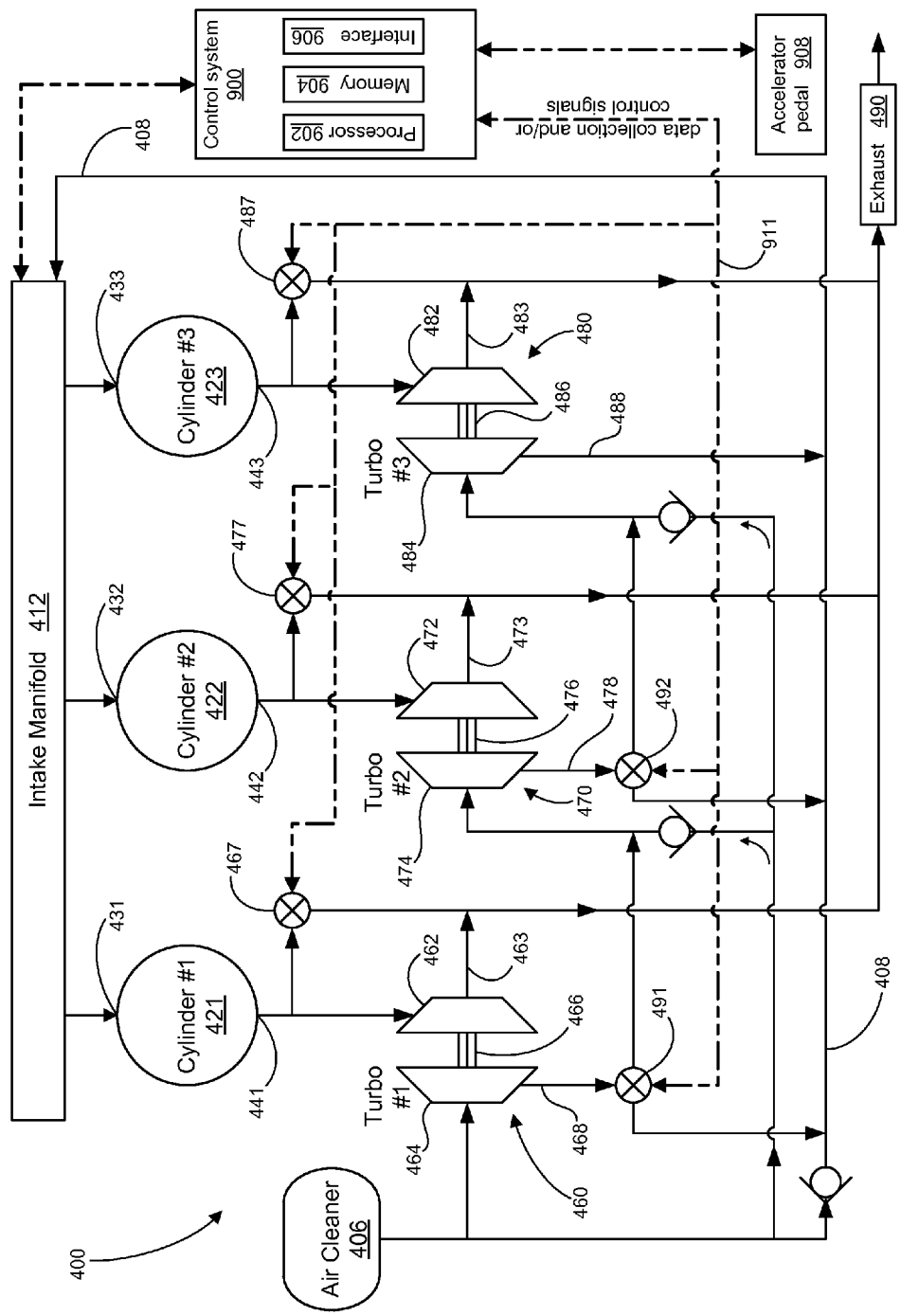
FIG. 4 illustrates an internal combustion engine system.

FIG. 4 illustrates an alternative configuring of the compressor outputs in implementations of improved turbocharging in internal combustion engine system 400. The cylinders 421, 422, 423 and their associated intake mechanisms 431, 432, 433 and exhaust mechanisms 441, 442, 443 operate as described above. Moreover, turbochargers 460, 470, 480 likewise operate to harvest exhaust gas energy as described above with regard to implementations illustrated in FIGS. 2 and 3. However, the outputs of the compressors 464, 474, 484 are configured so that the compressor outputs can be supplied to the intake manifold 412 in parallel, in an "in series" (compounding) fashion, or in a combination thereof.

More specifically, compressor 464 of turbocharger 460 connected to cylinder 421 is supplied with air (e.g., fresh air from air cleaner 406) and, when turbine 462 is driven by exhaust gases from cylinder 421 (which are sent to exhaust 490 via exhaust line 463), compressor 464 (coupled to turbine 462 by shaft 466) supplies compressed fresh air to its outlet 468. Turbocharger 470 (having turbine 472 coupled to compressor 474 by shaft 476 and having exhaust line 473) and turbocharger 480 (having turbine 482 coupled to compressor 484 by shaft 486 and having exhaust line 483) operate in a similar manner. Wastegates 467, 477, 487 can be provided in some implementations. Outlet 468 is coupled to a valve 491 that alternately permits compressed fresh air in line 468 to be delivered via fluid communication either to intake manifold 412 directly (via air intake line 408), or else to the inlet of compressor 474. Feeding the compressed (pressurized) fresh air output of compressor 464 to the inlet of compressor 474 results in a compounding or additive pressurization of air in line 468 when it is discharged through outlet 478. Further, the outlet of compressor 474 can be coupled to a similar valve 492 to permit supplying the output compressed (pressurized) fresh air of compressor 474 (twice-pressurized in the implementation(s) of FIG. 4) to the inlet of compressor 484 of turbocharger 480, again resulting in a further (compounding) pressurization or additive increase (thrice-pressurized in the implementation(s) of FIG. 4) for the compressed fresh air supplied via outlet 488 to intake air line 408 and thus to intake manifold 412.

Thus at low RPMs (e.g., at tip in for a vehicle implementing system 400 that is at a standing start), system 400 can provide immediate response without turbo lag and provide intake manifold 412 with compressed fresh air that is approximately three times more pressurized than would be available from a single compressor, allowing bright tip in at very low RPMs. Unlike earlier turbocharger systems and methods intended to reduce turbo lag, system 400 also performs well at high RPM levels because turbochargers can employ relatively large area inlet ports, reducing exhaust gas back pressure at high RPM levels, and in some implementations can switch to a parallel compressor output configuration. Implementations achieve this wide range of performance without the need for expensive and/or complex multiple-path structures, variable geometry structures, and the like.

As the engine of system 400 reaches higher RPM levels, the compressed fresh air compounding achievable with serial configurations implemented by valves 491 and 492 can be reduced or eliminated through selective valve control (e.g., using a control system, ECU, etc. as disclosed herein). For example, if turbine speeds and/or compressor wheel speeds exceed a threshold level, or if the pressure in intake manifold 412 exceeds a given threshold level, one or both of valves 491, 492 can be switched so that outlets 468, 478, respectively, are functionally in their "parallel mode" as equivalently illustrated in FIG. 3. Selective switching (including partial opening and/or closing) of valves 491, 492 can achieve a purely parallel configuration, a fully serial configuration (to maximize intake manifold pressure), and intermediate configurations that can provide other supply schemes.

Figure 7:
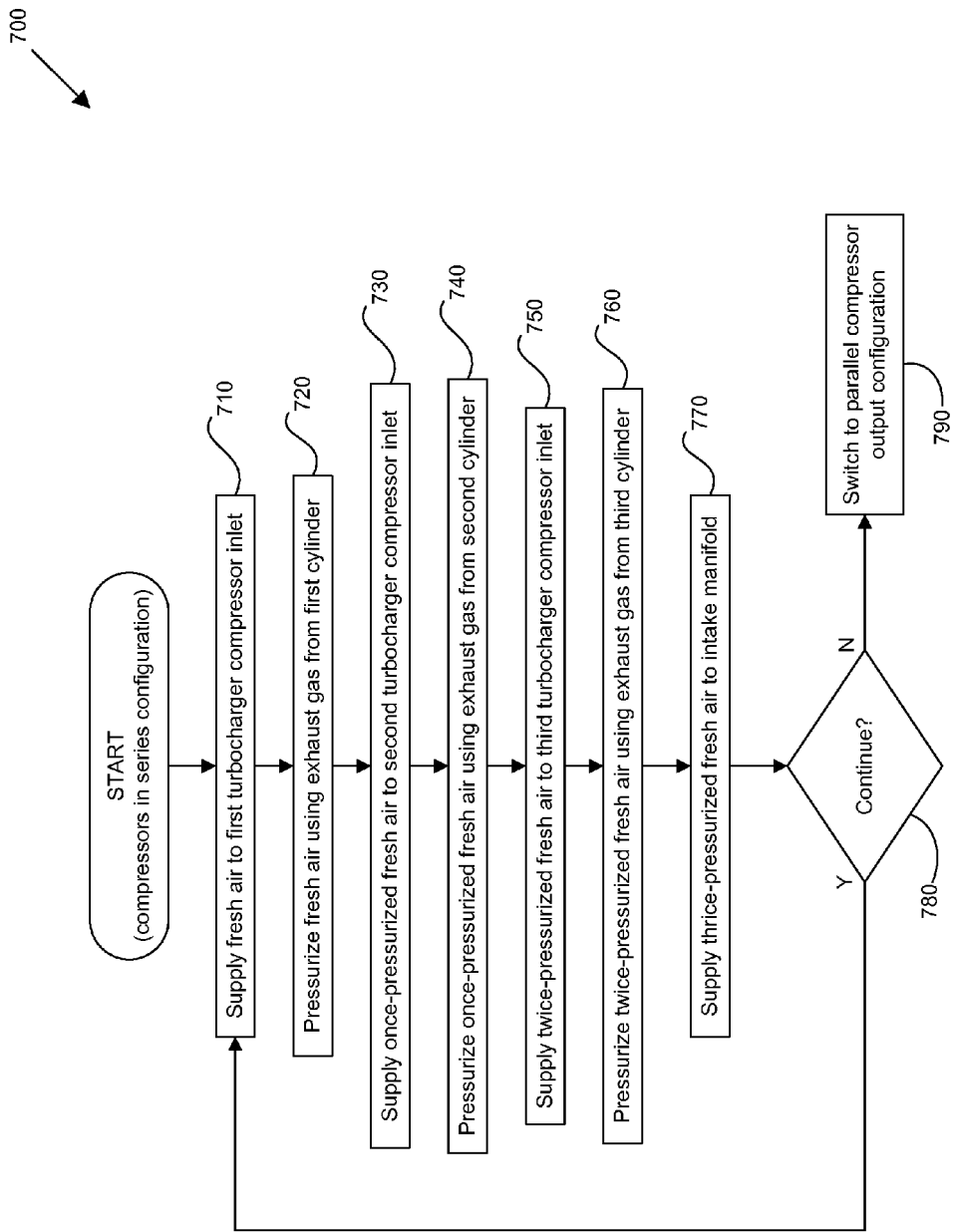
FIG. 7 illustrates a method of operation of an internal combustion engine system.

FIG. 7 illustrates one or more methods of operation of an internal combustion engine permitting increased pressurization of fresh air through turbocharger compressors configured in series, the "in series" configuration being used in some implementations until parallel operation is appropriate. Internal combustion engine operation (700) begins with the compressors configured "in series" (i.e., with the outlet of a first turbocharger's compressor connected to the inlet of a second turbocharger's compressor, the second turbocharger's compressor outlet connected to the inlet of a third turbocharger's compressor inlet, etc.) Fresh air is supplied to the first turbocharger compressor inlet (710) and is pressurized using exhaust gas from a first cylinder to which the first turbocharger is affixed (720). The once-pressurized air from the first turbocharger's compressor is supplied to the compressor inlet of a second turbocharger (730) and is further pressurized by the second turbocharger's compressor (740). The twice-pressurized fresh air is then supplied to the compressor inlet of a third turbocharger (750) and is further pressurized by the second turbocharger's compressor (760). After the fresh air has been pressurized three times, it is supplied to the intake manifold (770). If "in series" pressurization is to continue (780), then the process recommences (710) and, if not, the "in series" compressor configuration is switched to a parallel supply configuration (790) relative to the intake manifold.

This in series configuration of turbocharger compressor outputs can be used in connection with implementations of internal combustion engines in which a single turbocharger is affixed for each cylinder. However, in series configuring of turbocharger compressors also can be used in connection with traditional internal combustion engine configurations where multiple turbochargers are used (e.g., configuring a first turbocharger being supplied with exhaust gases from 3 cylinders to supply its pressurized fresh air from its compressor to the compressor of a second turbocharger that also is supplied with exhaust gases from 3 other cylinders, thus compounding pressurization by configuring the turbochargers' compressors in series).

Figure 5:
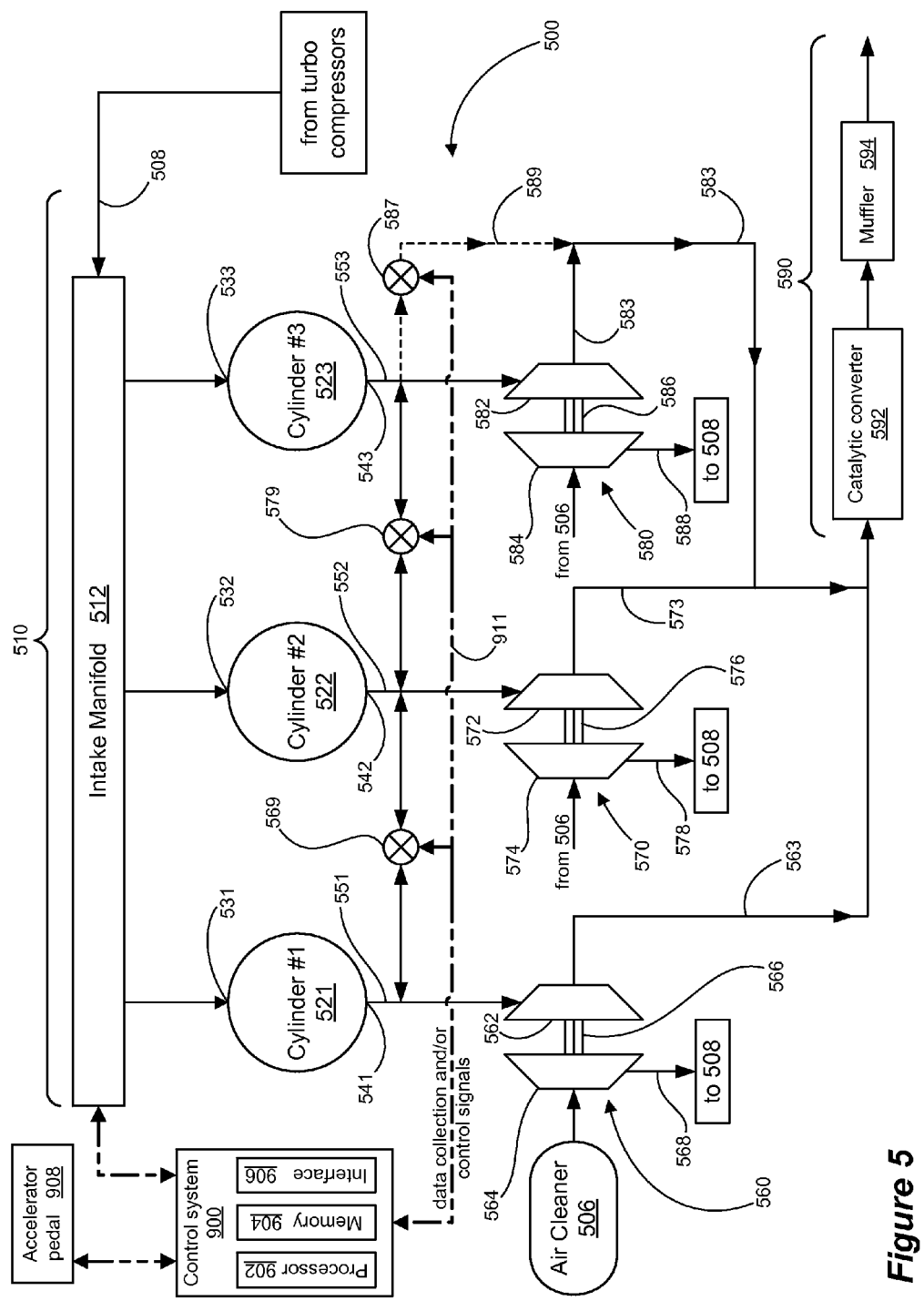
FIG. 5 illustrates an internal combustion engine system.

FIG. 5 illustrates implementations with regard to the use of exhaust gases from the various cylinders in improved turbocharging in an internal combustion engine system 500. Cylinders 521, 522, 523 and their associated intake mechanisms 531, 532, 533 and exhaust mechanisms 541, 542, 543 operate as described above, being supplied with combustion air from an intake air system 510 (e.g., intake manifold 512) that is supplied via intake line 508. Moreover, turbochargers 560, 570, 580 operate generally as described in connection with other turbochargers described herein, including receiving fresh air from an air cleaner 506 or the like and with regard to operation of their respective turbines 562, 572, 582, compressors 564, 574, 584, connecting shafts 566, 576, 586 and compressed air outlets 568, 578, 588). In FIG. 5, the exhaust gases from each cylinder are available (e.g., via exhaust lines 551, 552, 553) to that cylinder's corresponding turbocharger turbine. However, in some implementations bidirectional exhaust gas flow balancing valves 569, 579 are used in system 500 to permit improved utilization of available turbocharger capacity and exhaust gas energy, to provide more consistent exhaust gas flow (e.g., constant pressure flow), and to assist in reducing turbulence in the system. For example, if turbocharger 560 is unable to utilize exhaust gas discharged from cylinder 521, that "unused" exhaust gas can be routed to exhaust line 552 and thence to the inlet of turbine 572 of turbocharger 570 when balancing valve 569 is configured to permit such cross-flow (similarly, exhaust gas can be shared with turbocharger 580 via balance valve 579). The reverse condition exists with exhaust gas discharged from cylinder 522 and available turbocharger capacity in turbocharger 560. Implementations can utilize balancing valve 579 alone, balancing valve 569 alone, or both valves in combination (and this exhaust gas flow balancing can be implemented with a 2-cylinder system and with systems having more than three cylinders). Moreover, balancing valves 569, 579 can be configured to permit partial opening of the valves to provide better control of exhaust gas cross-flow within system 500. In some implementations balancing valves 569, 579 operate in tandem (i.e., both open, both closed, etc.).

Balancing valves 569, 579 can be controlled by an engine control unit that receives sensor readings and/or data from the turbochargers 560, 570, 580, the intake manifold 512 and/or other system components and locations. Based on mapping, programming, testing, etc., cross-flow balancing using balancing valves can be programmed and/or available "on the fly" based on changing engine conditions.

As used in connection with other operational aspects of internal combustion engine configurations, engine mapping can be performed and utilized with various implementations of turbocharging systems disclosed herein. Mapping data and techniques can be used to control wastegates, compressor output valves, balancing valves, and other components and aspects of turbocharged internal combustion engine operation.

A wastegate 587 is optionally provided in connection with cylinder 523 and turbocharger 580 to permit wastegating of exhaust gases that cannot be utilized by any of the turbochargers (e.g., when both balancing valves 569, 579 are open and intake manifold pressure is too high). If wastegate 587 is implemented (e.g., as a "shared" wastegate), exhaust gas can be directed via optional exhaust gas line 589 to the exhaust line 583 that is connected to turbine 582 as well as being connected to exhaust line 563 from turbocharger 560 and exhaust line 573 from turbocharger 570. Other combinations of wastegates and balancing valves can be utilized in connection with implementations of improved turbocharging, as will be appreciated by those skilled in the art.

Wastegate 587 can be removed when the turbochargers are configured to accommodate top RPM performance conditions. In such implementations one or more of the turbochargers' turbines and turbine inlets are sized to accommodate the wide variety of operating conditions.

Figure 8:
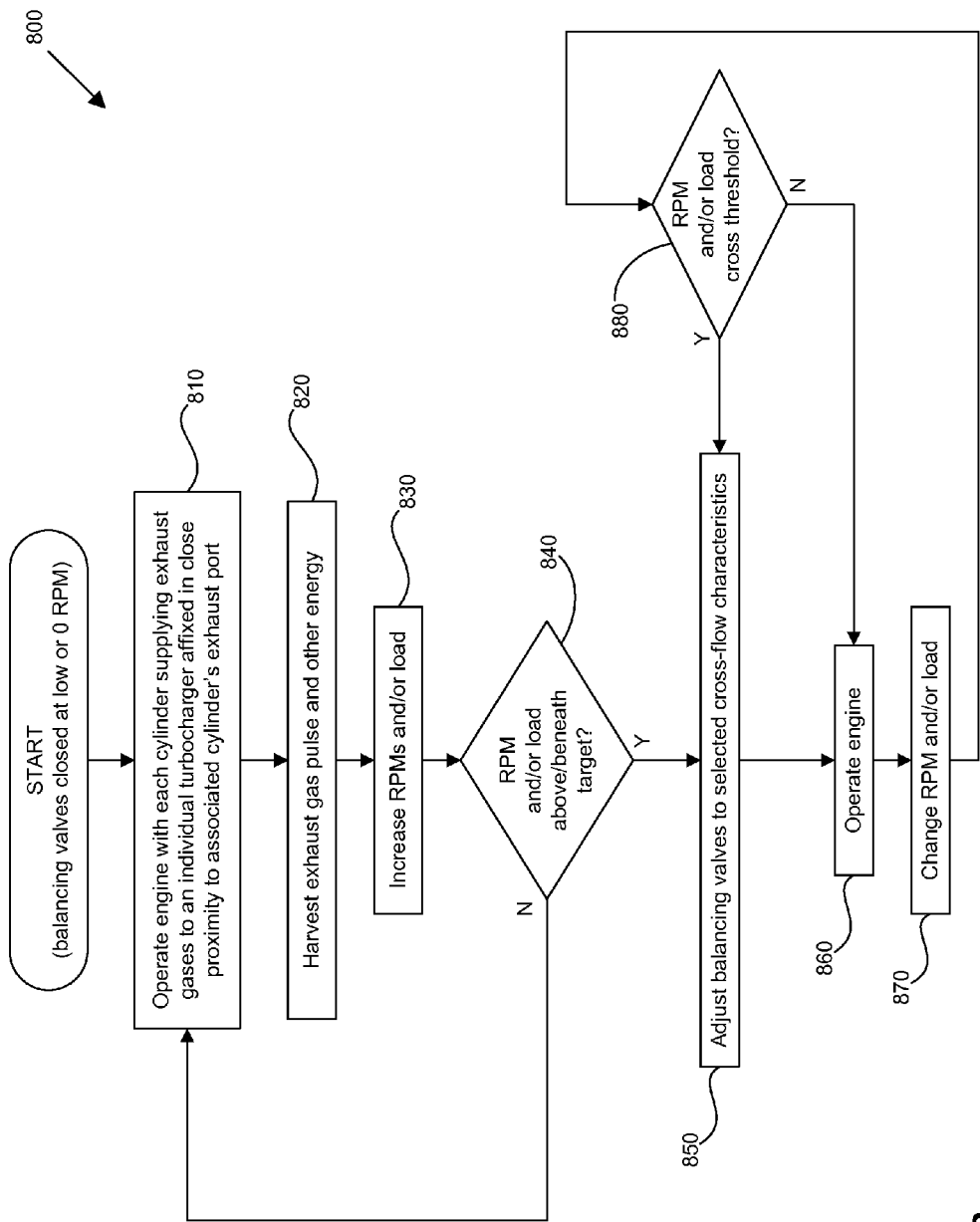
FIG. 8 illustrates a method of operation of an internal combustion engine system.

FIG. 8 illustrates one or more methods of operation of an internal combustion engine permitting harvesting of exhaust gas pulse energy at low RPMs and/or loads and permitting more of an exhaust gas "constant flow" operation at medium and higher RPMs. Internal combustion engine operation (800) begins with the balancing valves closed at low or 0 RPM. In the configuration of FIG. 5 as a non-limiting example, this would mean that valves 569, 579 are closed, thus limiting the flow of exhaust gases from the exhaust valve of cylinder 521 to turbocharger 560 only. Likewise exhaust gases from cylinder 522 flow only to turbocharger 570 and exhaust gases from cylinder 523 flow only to turbocharger 580. This initial closed balancing valve configuration means that, as the engine is operated (810), each turbocharger's turbine will harvest energy from the exhaust gases while they are still exhibiting pulse characteristics and while they still possess high energy levels (820), due to the mounting of an individual turbocharger in close proximity to each cylinder. As the engine is operated, the RPM and/or load level increases (830). The RPM and/or load level is monitored (840). If a selected threshold is not met, then operation continues (810).

If a threshold is passed or other condition met, then the balancing valves are adjusted according to desired performance criteria (850). The thresholds and performance criteria can be determined through engine mapping and/or any other appropriate methodology or means. Adjustment of the balancing valves configures the engine to achieve desired cross-flow characteristics between the exhaust gas pathways of the various cylinders. Using the configuration of FIG. 5 again as a non-limiting example, the cross-flow characteristics between exhaust lines 551, 552, 553 can thus be controlled through valves 569, 579 being closed, open or partially open. The engine is operated (860) and subsequently the RPM and/or load level can be changed (870). Such changes can be monitored (880) to evaluate whether any threshold has been crossed—if so, then further adjustment can be made (850); if not, then the engine continues operation in the then-current balancing valve setting. In some implementations multiple balancing valves will operate in unison, while in other implementations each balancing valve can operate independently. As the balancing valves are adjusted to increase cross-flow among the cylinders' exhaust lines, the flow of exhaust gases through the turbochargers more closely resembles a constant flow arrangement having less of a pulse nature. Moreover, a single wastegate (e.g., wastegate 587 in the non-limiting exemplary configuration of FIG. 5) can service the entire set of cylinders and exhaust gas wastegated as necessary—that wastegate can be placed in any position that allows fluid communication between the cylinder exhaust lines and the wastegate.

In one or more implementations, components, operations and other aspects of a given internal combustion engine system can be controlled by a control system, one or more implementations of which are shown in FIGS. 4 and 5. Control system 900 can be or be similar to an engine control unit (ECU), which is well known in the art and used in connection with many internal combustion engines. In exemplary implementations herein, an engine control system 900 can be configured to monitor appropriate indicators to assist in controlling internal combustion engine systems. For example, in controlling the delivery of compressed air from the turbochargers' compressors, control system 900 can utilize sensor readings from a manifold absolute pressure sensor (a MAP sensor), a mass airflow sensor (MAF sensor), and/or a boost sensor to provide data on which valves are controlled with regard to parallel and "in series" configurations for compressed air from the turbochargers. Data can be collected from various engine-related sources (e.g., accelerator pedal 908 in FIG. 4).

In FIG. 4 control system 900 includes one or more processors 902, memory 904 and one or more interfaces 906. System 900 can also include circuitry such as the circuitry used in an engine control unit (ECU) as well as collected and stored data and other aspects of engine mapping. As disclosed herein, various systems, methods, etc. can be implemented in connection with such a control system, for example, through data processing and control logic that depends on one or more engine system parameters and/or conditions.

Sensors and the like can transmit data to control system 900 using interface(s) 906, after which control system 900 can generate control commands, signals and the like to various engine system components (sensor data can be collected and control signals deployed via communication lines 911, non-limiting examples of which are shown in FIGS. 4 and 5). As is known to those skilled in the art an ECU or similar control system can be configured to control a variety of functions and components (e.g., turbochargers, valves, air flow controls, exhaust gas controls, wastegates, etc.).

In some implementations control systems can measure the pressure (and/or other parameters) within an intake manifold and control the configuration of compressor outputs (control of these compressor outputs also can be based on additional/other information available from an internal combustion engine system). In some implementations (e.g., FIG. 4), regarding compressors running in series or parallel, the pressure in the intake manifold 412 would be monitored. From a standing start, the compressor outputs 468, 478, 488 would operate in a series configuration, as discussed above. Once an intake manifold pressure threshold is exceeded and maintained for a selected time period (e.g., 3-5 seconds), the compressor outputs 468, 478, 488 would switch to parallel compressor operation in supplying pressurized air to intake manifold 412. Other collected data, for example from a throttle setting or the like, can be used in connection with such compressed air regulation.

Similarly, balancing valves 569, 579 and wastegate 587 (if present) can be controlled by control system 900 in FIG. 5 based on data collected from intake manifold 512 (e.g., pressure) and/or turbines 562, 572, 582 (e.g., turbine speeds), or based on available engine mapping data. In some implementations, the exhaust gas cross-flow configuration shown in FIG. 5 can be switched to send unused exhaust gases discharged by cylinders 521, 522 to the exhaust system 590 (which, for example, includes catalytic converter 592 and muffler 594) in lieu of being sent to an adjacent turbochargers' turbine inlets.

Figure 6A:
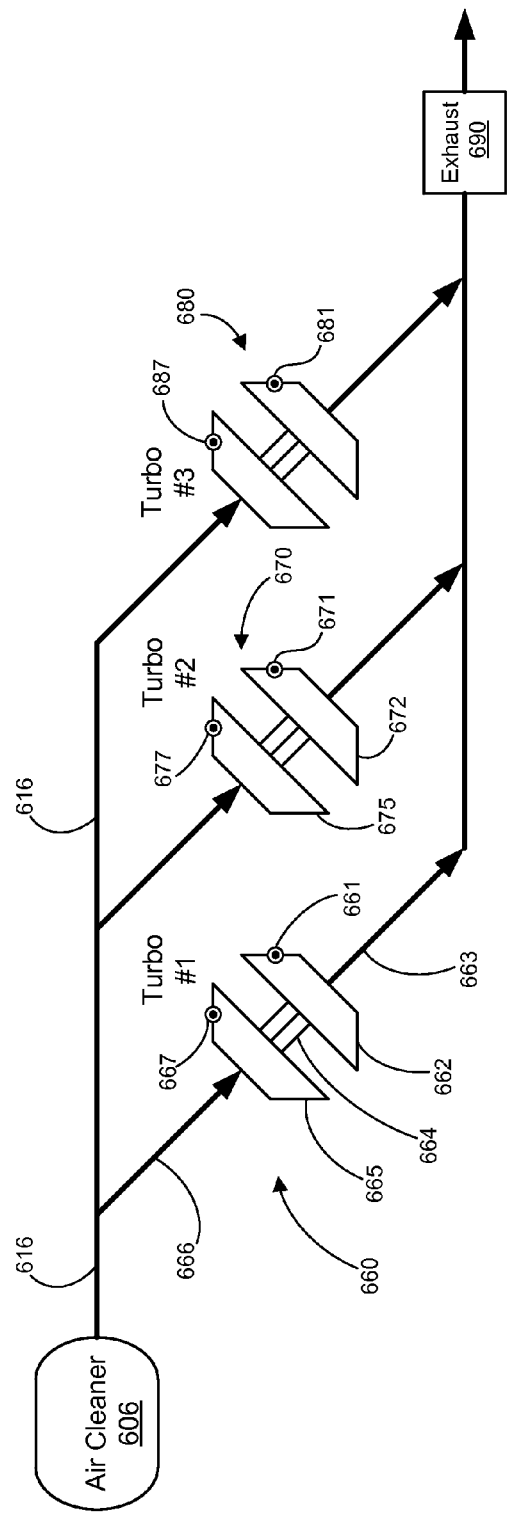
FIG. 6A illustrates an internal combustion engine system.

Mounting a turbocharger in close proximity to the cylinder exhaust valve(s) and respective exhaust port may present packaging challenges, depending on the size and configuration of the turbochargers utilized, especially with regard to lateral interference. FIG. 6A illustrates one implementation of improved turbocharging in an internal combustion engine in which the individual turbochargers are nested to permit mounting of each turbocharger in close proximity to the exhaust valve of its corresponding cylinder, as well as simplifying the plumbing and routing of fresh air and exhaust gases. Turbochargers are mounted to the engine cylinder head or the like using an angular orientation that facilitates routing of fresh air and exhaust gases, as well as spacing of turbochargers relative to one another. This nesting of turbochargers in some implementations provides improved or optimal mounting of the turbochargers so that they are affixed in close proximity to the exhaust valves of their respective cylinders. In some implementations, an angular orientation of 15° to 75° can be used (the "angular orientation" of each turbocharger being measured between the line connecting the centers of the cylinder head exhaust ports and the turbocharger shaft axis, in a plane parallel with the cylinder head exhaust face), though each engine's cylinder arrangement, cylinder block configuration and cylinder configuration may affect the ways in which turbochargers can be affixed in close proximity to the cylinders' exhaust valve(s).

Figure 6B:
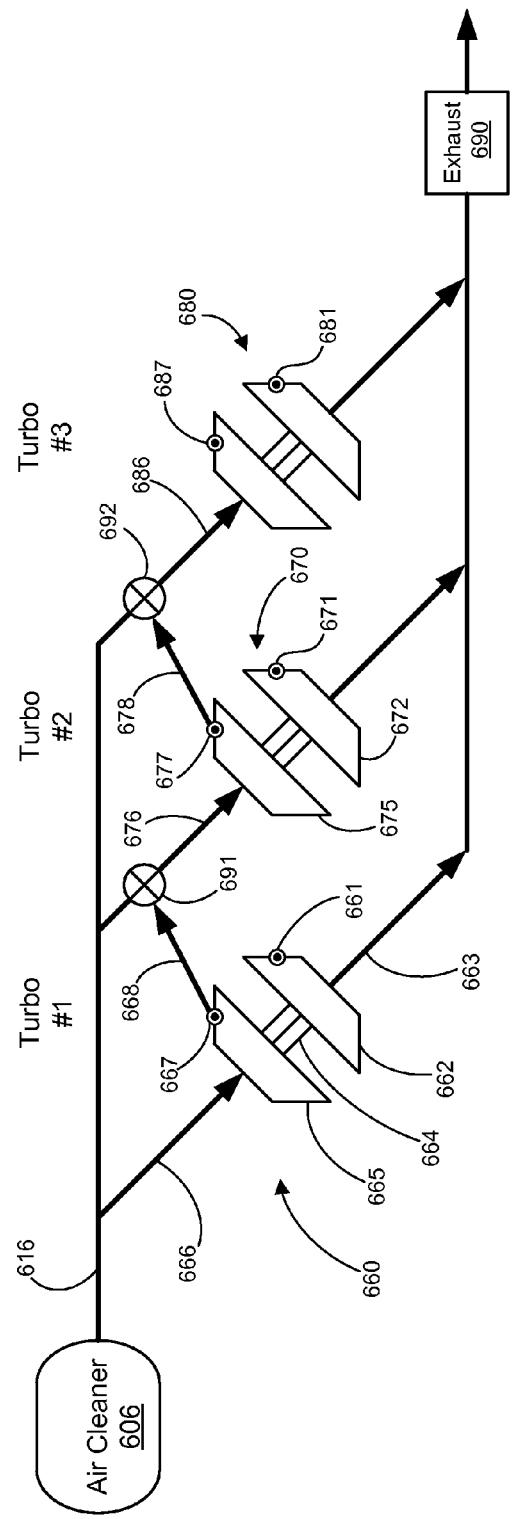
FIG. 6B illustrates an internal combustion engine system.

FIGS. 6A and 6B show an exemplary nesting implementation using an angular orientation (as defined above) of ~45° for each turbocharger (it is possible that all turbochargers in an implementation might not have the same angular orientation), which provides space for plumbing of compressed air and exhaust gases, as well as adequate space for the turbines and compressor wheels of the turbochargers 660, 670, 680. Any angular orientation that provides suitable access to inlets and outlets, as well as unobstructed operation of the turbochargers' turbines and compressor wheels can be used.

System 600 shows an air cleaner 606 or other source of fresh air provided to fresh air line 616. Three turbochargers 660, 670, 680 are connected to line 616. Exemplary turbocharger 660 has an exhaust gas inlet 661 affixed in close proximity to a first cylinder exhaust valve (e.g., by mounting the turbocharger 660 directly to the cylinder head that partially defines and houses the first cylinder). Exhaust gas inlet 661 is depicted in FIG. 6A as accepting exhaust gas traveling in a direction perpendicularly out of the plane of the drawing in FIG. 6A. Exhaust gases discharged from the first cylinder's exhaust valve spin turbine 662 and thus shaft 664 and compressor wheel 665. After engaging the turbine 662, the exhaust gases are discharged from turbocharger 660 via turbine outlet 663 and thence to the engine's exhaust system 690.

Fresh air supplied via line 616 to compressor inlet 666 is pressurized by compressor wheel 665 and the pressurized fresh air exits turbocharger 660 through compressor outlet 667. In FIG. 6A the compressed fresh air from each turbocharger 660, 670, 680 is supplied directly to an intake manifold (not shown). Again, as with the turbine inlet 661, compressor outlet 667 is depicted in FIG. 6A as discharging pressurized fresh air traveling in a direction perpendicularly out of the plane of the drawing in FIG. 6A.

Similarly, turbocharger 670 has a turbine inlet 671 for turbine 672 that accepts exhaust gas from a second cylinder and drives compressor wheel 675 to pressurize fresh air that is then discharged from compressor outlet 677. Also, a third turbocharger 680 accepts exhaust gas from a third cylinder via turbine inlet 681 and provides pressurized fresh air through compressor outlet 687. As noted in connection with some implementations, exhaust gases from the various cylinders can be made available to multiple turbochargers via balancing valves or the like (not shown). In FIG. 6A the pressurized fresh air can be supplied directly to the intake manifold or can be configured in various ways. One such implementation for configuring pressurized fresh air from the turbochargers' compressors is illustrated in FIG. 6B.

FIG. 6B illustrates optional configuring of compressor fresh air supplying and pressurized fresh air outputs of turbochargers 660, 670, 680. The components of system 601 of FIG. 6B operate analogously to those of system 600 in FIG. 6A. However, the compressor outlet 667 of turbocharger 660 has a pressurized fresh air supply line 668 connected to valve 691, which provides the option of supplying pressurized fresh air output by turbocharger 660 to the compressor inlet 676 of turbocharger 670. Likewise, compressor outlet 677 of turbocharger 670 can supply its pressurized fresh air via line 678 through valve 692 to the compressor inlet 686 of turbocharger 680. As noted in connection with the disclosure of in series pressurization in one or more implementations of FIG. 4, pressurized fresh air from compressor outlet 687 can then be supplied at a higher pressure to an intake manifold or the like.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. An internal combustion 4-cycle engine system comprising:
   an internal combustion engine comprising a plurality of combustion cylinders comprising a first combustion cylinder, a second combustion cylinder, and a third combustion cylinder, wherein each combustion cylinder of the plurality of combustion cylinders comprises an exhaust valve through which combustion cylinder exhaust gases are discharged during operation of the internal combustion engine;
   an intake air system configured to supply combustion air to each of the plurality of combustion cylinders;
   an engine exhaust system configured to receive combustion cylinder exhaust gases;
   a plurality of low rotational inertia turbochargers comprising a first turbocharger, a second turbocharger and a third turbocharger, each turbocharger in the plurality of turbochargers comprising:
      a turbine comprising:
         a turbine wheel having a diameter less than 2.6 inches;
         a turbine inlet configured to receive combustion cylinder exhaust gases to drive the turbine wheel; and
         a turbine outlet configured to deliver combustion cylinder exhaust gases to the engine exhaust system; and
      a turbine-driven compressor comprising:
         a compressor wheel;
         a compressor inlet configured to receive air to be pressurized by the compressor wheel; and
         a compressor outlet configured to deliver pressurized combustion air; and
   an engine control unit configured to switch internal combustion engine system operation between a first mode and a second mode;
   wherein, in the first mode, the first turbocharger compressor outlet is in fluid communication with the second turbocharger compressor inlet, and further wherein the second turbocharger compressor outlet is in fluid communication with the third turbocharger compressor inlet; and
   further wherein, in the second mode, each turbocharger compressor outlet is in direct fluid communication with the intake air system;
   further wherein the first turbocharger turbine inlet is in fluid communication with the first combustion cylinder exhaust valve;
   further wherein the second turbocharger turbine inlet is in fluid communication with the second combustion cylinder exhaust valve;
   further wherein the third turbocharger turbine inlet is in fluid communication with the third combustion cylinder exhaust valve; and
   further wherein a distance between each combustion cylinder exhaust valve and the associated turbocharger turbine inlet is less than 10 inches.

2. The engine system of claim 1 wherein
the first turbocharger turbine inlet is coupled to the second turbocharger turbine inlet by a first balancing valve;
further wherein the second turbocharger turbine inlet is coupled to the third turbocharger turbine inlet by a second balancing valve;
further wherein the engine control unit is further configured to operate the first and second balancing valves to control flow of combustion cylinder exhaust gases among the first turbocharger turbine inlet, the second turbocharger turbine inlet and the third turbocharger turbine inlet such that more than one turbocharger turbine can receive combustion cylinder exhaust gases from a single combustion cylinder exhaust valve when the first and second balancing valves are open.

3. An internal combustion 4-cycle engine system comprising;
an internal combustion engine comprising a first combustion cylinder and a second combustion cylinder, wherein each combustion cylinder comprises an exhaust valve through which combustion cylinder exhaust gases are discharged during operation of the internal combustion engine;
an intake air system configured to supply combustion air to the first and second combustion cylinders;
an engine exhaust system configured to receive combustion cylinder exhaust gases;
a first turbocharger and a second turbocharger, each of the first and second turbochargers comprising:
a turbine comprising:
a turbine wheel having a diameter less than 2.6 inches;
a turbine inlet configured to receive combustion cylinder exhaust gases to drive the turbine wheel; and
a turbine outlet configured to deliver combustion cylinder exhaust gases to the engine exhaust system; and
a turbine-driven compressor comprising:
a compressor wheel;
a compressor inlet configured to receive air to be pressurized by the compressor wheel; and
a compressor outlet configured to deliver pressurized combustion air; and
an engine control unit configured to switch internal combustion 4-cycle engine system operation between a first mode and a second mode;
wherein, in the first mode, the first turbocharger compressor outlet is in fluid communication with the second turbocharger compressor inlet to supply air pressurized by the first turbocharger compressor to the second turbocharger compressor inlet; and
further wherein, in the second mode, each turbocharger compressor outlet is in parallel fluid communication with the intake air system;
further wherein the first turbocharger turbine inlet is in fluid communication with and affixed within 10 inches of the first combustion cylinder exhaust valve; and
further wherein the second turbocharger turbine inlet is in fluid communication with and affixed within 10 inches of the second combustion cylinder exhaust valve.

4. The engine system of claim 3 wherein the first turbocharger turbine inlet is coupled to the second turbocharger turbine inlet by a balancing valve system comprising a balancing valve;
further wherein the balancing valve system is configured to control flow of combustion cylinder exhaust gases from the first combustion cylinder exhaust valve to both the first turbocharger turbine inlet and the second turbocharger turbine inlet so that combustion cylinder exhaust gases from the first turbocharger exhaust valve can flow to the second turbocharger turbine inlet when the balancing valve is open.

5. The engine system of claim 4 further comprising a wastegate in fluid communication with the first turbocharger turbine inlet and the second turbocharger turbine inlet when the balancing valve is open.

6. An internal combustion engine system comprising an engine air intake system, an engine exhaust system, an internal combustion engine comprising a first combustion cylinder, a second combustion cylinder and a third combustion cylinder, wherein each combustion cylinder has an exhaust valve through which exhaust gases are discharged during operation of the internal combustion engine, the internal combustion engine system further comprising:
a first turbocharger comprising a first turbine and a first turbine-driven compressor, wherein the first turbocharger turbine and turbine-driven compressor comprise:
a turbine wheel having a diameter less than 2.6 inches;
a turbine inlet in fluid communication with and affixed within 10 inches of the first combustion cylinder exhaust valve, and configured to receive exhaust gases from the first combustion cylinder to drive the turbine wheel;
a turbine outlet configured to deliver exhaust gases from the turbine wheel to the engine exhaust system;
a compressor wheel having a diameter less than 2.6 inches;
a compressor inlet configured to receive air to be pressurized by the compressor wheel; and
a compressor outlet configured to deliver air pressurized by the compressor wheel to the engine intake air system;
a second turbocharger comprising a second turbine and a second turbine-driven compressor, wherein the second turbocharger turbine and turbine-driven compressor comprise:
a turbine wheel having a diameter less than 2.6 inches;
a turbine inlet in fluid communication with and affixed within 10 inches of the second combustion cylinder exhaust valve, and configured to receive exhaust gases from the second combustion cylinder to drive the turbine wheel;
a turbine outlet configured to deliver exhaust gases from the turbine wheel to the engine exhaust system;
a compressor wheel having a diameter less than 2.6 inches;
a compressor inlet configured to receive air to be pressurized by the compressor wheel; and
a compressor outlet configured to deliver air pressurized by the compressor wheel to the engine intake air system;
a third turbocharger comprising a third turbine and a third turbine-driven compressor, wherein the third turbocharger turbine and turbine-driven compressor comprise:
a turbine wheel having a diameter less than 2.6 inches;
a turbine inlet in fluid communication with and affixed within 10 inches of the third combustion cylinder exhaust valve and configured to receive exhaust gases from the third combustion cylinder to drive the turbine wheel;

a turbine outlet configured to deliver exhaust gases from the turbine wheel to the engine exhaust system;

a compressor wheel having a diameter less than 2.6 inches;

a compressor inlet configured to receive air to be pressurized by the compressor wheel; and a compressor outlet configured to deliver air pressurized by the compressor wheel to the engine intake air system;

wherein the engine system is configured to operate in a first mode and in a second mode;

wherein, in the first mode, the first turbocharger compressor outlet is in fluid communication with the second turbocharger compressor inlet and is configured to deliver air pressurized by the first turbocharger compressor to the second turbocharger compressor inlet; and further wherein, in the first mode, the second turbocharger compressor outlet is in fluid communication with the third turbocharger compressor inlet and is configured to deliver air pressurized by the second turbocharger compressor to the third turbocharger compressor inlet; and further wherein, in the second mode, the first turbocharger compressor outlet, the second turbocharger compressor outlet, and the third turbocharger compressor outlet are in parallel fluid communication with the intake air system.

7. An internal combustion engine system comprising an engine air intake system, an engine exhaust system, an internal combustion engine comprising a first combustion cylinder, a second combustion cylinder and a third combustion cylinder, wherein each combustion cylinder has an exhaust valve through which exhaust gases are discharged during operation of the internal combustion engine, the internal combustion engine system further comprising:

a first turbocharger comprising a first turbine and a first turbine-driven compressor, wherein the first turbocharger turbine and turbine-driven compressor comprise:

a turbine wheel having a diameter less than 2.6 inches;

a turbine inlet in fluid communication with and affixed within 10 inches of the first combustion cylinder exhaust valve, and configured to receive exhaust gases from the first combustion cylinder to drive the turbine wheel;

a turbine outlet configured to deliver exhaust gases from the turbine wheel to the engine exhaust system;

a compressor wheel having a diameter less than 2.6 inches;

a compressor inlet configured to receive air to be pressurized by the compressor wheel; and a compressor outlet configured to deliver air pressurized by the compressor wheel to the engine intake air system;

a second turbocharger comprising a second turbine and a second turbine-driven compressor, wherein the second turbocharger turbine and turbine-driven compressor comprise:

a turbine wheel having a diameter less than 2.6 inches;

a turbine inlet in fluid communication with and affixed within 10 inches of the second combustion cylinder exhaust valve, and configured to receive exhaust gases from the second combustion cylinder to drive the turbine wheel;

a turbine outlet configured to deliver exhaust gases from the turbine wheel to the engine exhaust system;

a compressor wheel having a diameter less than 2.6 inches;

a compressor inlet configured to receive air to be pressurized by the compressor wheel; and a compressor outlet configured to deliver air pressurized by the compressor wheel to the engine intake air system;

a third turbocharger comprising a third turbine and a third turbine-driven compressor, wherein the third turbocharger turbine and turbine-driven compressor comprise:

a turbine wheel having a diameter less than 2.6 inches;

a turbine inlet in fluid communication with and affixed within 10 inches of the third combustion cylinder exhaust valve, and configured to receive exhaust gases from the third combustion cylinder to drive the turbine wheel;

a turbine outlet configured to deliver exhaust gases from the turbine wheel to the engine exhaust system;

a compressor wheel having a diameter less than 2.6 inches;

a compressor inlet configured to receive air to be pressurized by the compressor wheel; and a compressor outlet configured to deliver air pressurized by the compressor wheel to the engine intake air system;

wherein the first turbocharger turbine inlet is coupled in fluid communication to the second turbocharger turbine inlet by a first balancing valve;

further wherein the second turbocharger turbine inlet is coupled in fluid communication to the third turbocharger turbine inlet by a second balancing valve;

further wherein the first balancing valve is configured to control flow of exhaust gases between the first turbocharger turbine inlet and the second turbocharger turbine inlet;

further wherein the second balancing valve is configured to control flow of exhaust gases between the second turbocharger turbine inlet and the third turbocharger turbine inlet;

further wherein, when the first balancing valve is open, exhaust gas from the first combustion cylinder can flow to the first turbocharger turbine inlet and the second turbocharger turbine inlet; and further wherein, when the second balancing valve is open, exhaust gas from the second combustion cylinder can flow to the second turbocharger turbine inlet and the third turbocharge turbine inlet.

* * * * *